United States Patent

Kline et al.

[11] Patent Number: 5,812,527
[45] Date of Patent: Sep. 22, 1998

[54] SIMPLIFIED CALCULATION OF CELL TRANSMISSION RATES IN A CELL BASED NETWOOK

[75] Inventors: Richard B. Kline, E. Walpole; Krishnan Ramakrishnan, Plainville; Levent Gun, Hopkinton, all of Mass.

[73] Assignee: Motorola Inc., Schaumburg

[21] Appl. No.: 625,116

[22] Filed: Apr. 1, 1996

[51] Int. Cl.⁶ .................................................. H04L 12/56
[52] U.S. Cl. .................... 370/232; 370/253; 370/397; 370/465
[58] Field of Search .................... 370/230, 231, 370/232, 233, 234, 235, 236, 252, 253, 395, 396, 397, 409, 412, 465, 545; 395/200.16, 200.13

[56] References Cited

U.S. PATENT DOCUMENTS

| | | | |
|---|---|---|---|
| 5,448,567 | 9/1995 | Dighe et al. | 370/233 |
| 5,457,687 | 10/1995 | Newman | 370/232 |
| 5,497,375 | 3/1996 | Hluchyj et al. | 370/232 |
| 5,530,695 | 6/1996 | Dighe et al. | 370/232 |
| 5,604,731 | 2/1997 | Grossglauser et al. | 370/232 |
| 5,633,859 | 5/1997 | Jain et al. | 370/234 |
| 5,633,861 | 5/1997 | Hanson et al. | 370/232 |

OTHER PUBLICATIONS

"The ATM Forum Newsletter." Education Corner Jill Kaufman, IBM North America Market Awareness Committee Chair, Education Working Group. Oct. 1995, V. 3. Issue 4.

"Congestion Control and Traffic Management in ATM Networks: Recent Advances and A Survey." By Raj Jain. Department of Computer and Information Science. The Ohio State University. Columbus, Ohio 43210. Email: Jain@ ACM.Org. Draft version: Jan. 26, 1995.

"Traffic Management Specification Version 4.0".

*Primary Examiner*—Alpus H. Hsu
*Attorney, Agent, or Firm*—James A. Coffing; Jeffrey T. Klayman

[57] ABSTRACT

A cell based network (100) for transmitting ATM user cells (118), including ABR data cells (118$_D$) and forward control, or RM, cells (118$_{FRM}$) at predetermined cell rates from at least one user source (102) in a virtual connection (VC, 110) through at least one ATM switch (120) and at least one transmission link (130) in the network to at least one user destination (104), employs a method and apparatus for controlling a user source (102) transmission cell rate in the presence of congestion in the VC (110). The calculation of a Fair Share cell transmission rate is written into a backward control, or RM, cell (118$_{BRM}$) optionally takes place only in the presence of congestion at an ATM Switch (120). The calculation of the Fair_Share value is simplified and calculation time is shortened by changing the number of active ABR VCs ($N_{ABR}$) to a factor of two ($E_{NABR}$) and dividing the maximum cell transmission rate by $E_{NABR}$.

20 Claims, 10 Drawing Sheets

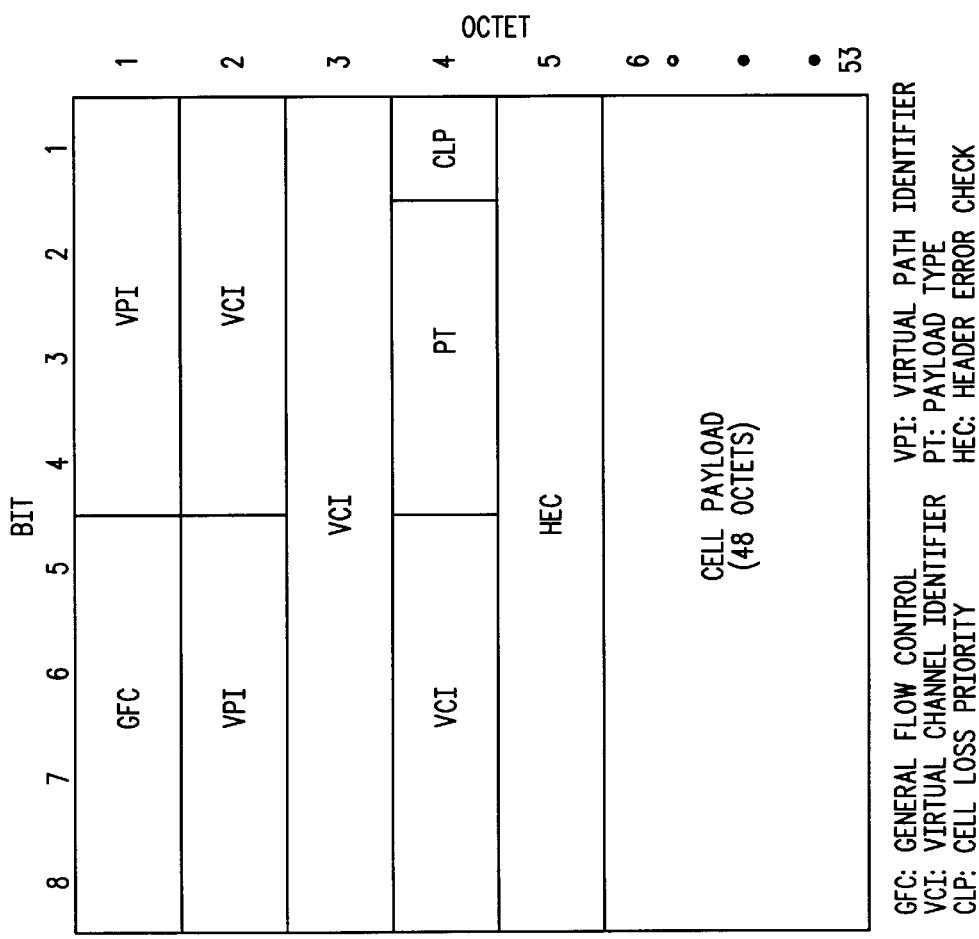

SIMPLIFIED CALCULATION OF CELL TRANSMISSION RATES IN A CELL BASED NETWOOK

CROSS-REFERENCE TO RELATED APPLICATIONS

Reference is hereby made to commonly assigned, co-pending U.S. patent application Ser. No. 08/625,029 filed on the same date herewith, in the names of Levent Gun, Krishnan Ramakrishnan, and Richard B. Kline for SYSTEM FOR CONTROLLING CELL TRANSMISSION RATE IN THE PRESENCE OF CONGESTION IN A CELL BASED NETWORK.

FILED OF THE INVENTION

The present invention relates generally to controlling congestion in cell-based information transmission networks, particularly Asynchronous Transfer Mode (ATM) networks, and more particularly to simplifying the calculation of an Explicit Rate (ER) written into a Resource Management (RM) cell of Available Bit Rate (ABR) traffic.

BACKGROUND OF THE INVENTION

ATM is a network data transmission system and methodology or protocol and is described in the ATM User-Network Interface Specification, Version 3.0, by the ATM Forum, published by Prentice-Hall in 1993, The Traffic Management Specification, Version 4.0, AF-95-0013R11, published by the ATM Forum, and related specifications and other publications authored by the ATM Forum. ATM enables diverse information traffic types, such as voice/audio, data and video to efficiently share a common transmission path and switching elements in Virtual Connections (VCs) therethrough between ATM traffic sources and destinations. Generally, ATM traffic is formatted into fixed size user cells having defined headers (interpreted by the ATM network for controlling and switching the cells through the network) and payloads (containing user data, not interpreted by the network), as described below, so that diverse transmission rates may be accommodated without complex synchronization functions. ATM has the potential for supporting diverse traffic with differing tolerances for delay, jitter and cell loss, and differing requirements for bandwidth or throughput.

In this regard, ATM information networks are specified to support a number of traffic service categories, including Constant Bit Rate (CBR), Variable Bit Rate (VBR), Available Bit Rate (ABR) and Unspecified Bit Rate (UBR). The different service categories each have associated ATM traffic parameters that describe the time series of cells emitted by the various types of sources. CBR sources are described by the following two traffic descriptors: a Peak Cell Rate (PCR), which is the maximum rate that the source will emit cells, and a Cell Delay Variation Tolerance (CDVT), which is the amount of cell jitter, or variance from uniformly spaced cells (in time). VBR sources are described by a PCR, a Maximum Burst Size (MBS), which is the maximum number of cells that will be sent at a rate equal to the PCR (before a subsequent idle period), and a Sustainable Cell Rate (SCR), which is roughly equivalent to a long term average cell rate. ABR sources are described by a PCR and a Minimum Cell Rate (MCR), which is a minimum cell rate that the ABR subscriber has contracted with the network (i.e., an ABR is always allowed to emit cells at a rate that is at least as large as the MCR). Furthermore, the ABR source may operate at an Allowed Cell Rate (ACR), which is between the PCR and the MCR. Typically, the ACR is explicitly set periodically throughout the duration of the call by the network through a mechanism described below. UBR sources have no traffic descriptors and therefore the behavior of UBR sources is totally unspecified and unknown (to the network).

In general, the ATM system architecture is designed such that an ATM network can mix traffic from these various service categories onto a single common physical network link (transmission media) while guaranteeing specific Quality of Service (QoS) levels to the diverse traffic sources. CBR and (real time) VBR traffic categories are intended to address applications, e.g. circuit emulation and entertainment quality video, with precisely defined requirements for throughputs and delays. The UBR traffic category is intended for applications like data file transfers with minimal service requirements.

By contrast, the ABR traffic service category is intended to economically support applications with vague requirements for throughputs and delays, particularly traffic from certain types of data sources (data applications), where a specific set of traffic parameters, such as a required SCR or MBS, or a specific guaranteed QoS parameter (such as a maximum and/or mean cell delay) cannot be readily defined. The nature and constraints of the ABR service category as presently envisioned is described further by F. Bonomi et al. in "The Available Bit Rate Service", 53 Bytes (The ATM Forum Newsletter), v. 3, n. 4, Oct. 1995, incorporated herein by reference. Further information on the service categories, traffic parameters, and quality of service parameters can be found in the "Traffic Management Specification", Version 4.0, ATM Forum/95-0013R10, Straw Vote, February 1995, incorporated herein by reference.

ABR sources are guaranteed, provided that a source doesn't exceed its traffic contract (described by traffic parameters PCR and MCR) and provided that the source responds appropriately (per ABR reference behavior) to the explicit rate network feedback, adjusting its ACR accordingly, that the network will deliver all cells to the final destination with a small CLR. Furthermore, ABR sources are guaranteed, by the network, that available network capacity will be "fairly" shared among all ABR sources which may be emitting cells during a specific time instant.

ATM networks include user Source End Systems (SESs) and user Destination End Systems (DESs) linked for unidirectional or bidirectional information flow over logical Virtual Connections (VCs). The logical VCs share a common physical transmission medium through various transmission links that connect various ATM switches in an ATM network. The transmission paths include transmission links connected by ATM switches as described below, which have limited cell transmission resources, namely maximum upper limit bandwidths defined in bits per second (bps). Since each ATM cell contains the same number of bits, the upper limit bandwidths can also be defined in cells per second (i.e., a maximum cell transmission rate). As set forth in the Bonomi article, ABR traffic service is governed by a rate-based cell flow control protocol employing a feedback mechanism between the DES and the SES of each VC to avoid or control congestion on the transmission path of the VC.

In the ABR traffic category, the user SES adapts its cell rate to changing network conditions derived through feedback about the network state, including bandwidth availability, state of congestion, and impending congestion of VCs in transmission links and ATM switches. For ABR VCs, the SES creates a connection with a call setup request during which values for a set of ABR-specific parameters are prescribed. Once the SES has received permission to transmit user cells, an Allowed Cell Rate (ACR) is defined that is initially set at an Initial Cell Rate (ICR) and is always bounded between an MCR and a PCR. As shown below, in the ABR traffic category, an initial forward Resource Management (RM) cell precedes the transmission of data cells. The forward RM cells are formulated as described below and inserted within the stream of user data cells at a prescribed frequency, e.g., every $Nrm^{th}$ cell. The forward RM cells received at the DES are sent back as backward RM cells in the reverse path through the VC to the SES.

VCs through an ATM network are formed at call setup by routing the VC through ATM transmission links and ATM switches having differing bandwidths and may include ATM switches that at any given time support a number of other VCs for CBR, VBR, ABR and UBR traffic. As a result, congestion may occur in the ATM network, which can lead to the loss of cells arriving at loaded cell queues in an ATM switch.

In order to curtail the loss of cells, the ATM standards require the ATM network to provide feedback to all ABR sources. To meet this requirement, each ABR source must respond to the feedback by decreasing its ACR (if above the MCR) during times of network congestion. As shown below, the RM cells include an ER field that is to be written into by the ATM switches. The ER value is recalculated, compared to the existing ER field in the RM cell, and conditionally written into the ER field, thereby updating the ER field in the RM cell at each ATM switch along the path of the VC. The SES is required to respond to the ER field value in the backward RM cell by adjusting the source transmission rate.

Due to the high transmission rates typically used in ATM networks, and due to the floating point format used in the storage of the explicit rate in the RM cell, the calculation of an ER in the backward RM cells, is costly. A calculation of ERs for the RM cells of all ABR VCs through the ATM switch would involve calculations including one or more of the following: the number of active ABR sources, the CCR of each ABR source, the available transmission link bandwidth (maximum link bandwidth less an allowance for CBR and VBR VCs) as well as other possible source and network parameters, such as the ABR sources' MCR, present network utilization factors, etc. In practice, with an ATM switch port operating at a high bandwidth, e.g. 155 Mbps, the time to make such calculations is reduced to 0.0027 ms. ATM port speeds of 155 and 622 Mbps are commonplace, and higher rates of 2.4 and 9.6 Gbps (and higher) are expected. Thus, making such a floating point calculation for every backward RM cell is an onerous task, even for dedicated hardware.

Three currently proposed approaches to controlling congestion are summarized in the article by R. Jain, "Congestion Control and Traffic Management in ATM Networks: Recent Advances and a Survey", pp. 15–19, incorporated herein by reference. These approaches involve floating point calculations that are onerous. Moreover, user sources are not always in compliance with their negotiated traffic contract. For example, some user sources may intentionally or unintentionally violate their service contract by transmitting at a cell rate that exceeds their allowed cell rate. In other words, the CCR field of the user cells may understate the actual cell transmission rate and be "out of compliance." Therefore, the calculation using erroneously understated CCR fields for out of compliance sources would still result in too great an ER, and perhaps random loss of cells, thus diminishing QoS.

Usage Parameter Control (UPC), commonly referred to as "policing," at the User Network Interface (UNI) of traffic submitted by an SES is an essential requirement for public networks supporting multiple connections. Service providers must typically support lower bounds on the bandwidth provided, as well as QoS objectives applying to delays and cell loss. The need for mechanisms that protect legitimate users of the network from non-compliant users of the same network, and limit how various sources can affect each other is satisfied via the joint action of policing (UPC), scheduling and/or buffer management at ATM Ingress and Egress Switch Ports. Policing may not be needed in some private-network environments, although efficient mechanisms to ensure fair access to resources are still important.

Therefore, a need exists for a simplified calculation of cell transmission rate to control congestion in a cell based network. In particular, in the context of ATM networks, there is a need for a method and apparatus for simplifying the calculation of a Fair Share ABR cell transmission rate value written into the ER field of a backward RM cell to control congestion on the ATM network.

BRIEF DESCRIPTION OF THE DRAWINGS

FIG. 1 shows a schematic representation of a header and payload portion of an ABR user data cell as configured and employed in the present invention;

FIG. 2 shows a schematic representation of the header and payload of an ABR RM cell as configured and employed in the present invention;

DETAILED DESCRIPTION OF A PREFERRED EMBODIMENT

Figure 3:
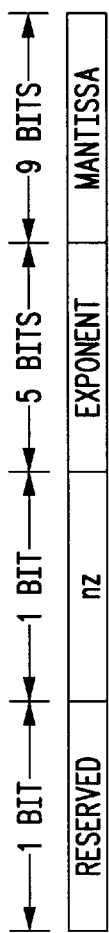
FIG. 3 shows a bit map of rate fields of the ABR RM cell as configured and employed in the present invention.

Generally, the ATM information network may be viewed as a cell-based network for transmitting user cells, including data cells and control cells, at predetermined cell rates from at least one user source in a virtual connection through at least one switch and at least one transmission link in the network to at least one user destination, each switch and transmission link having a maximum cell transmission rate. The present invention encompasses a method and apparatus for controlling a user source transmission rate to avoid cell loss in the virtual connection of cell based networks. Each user source periodically transmits the control cells with data cells to each transmission link and switch in the virtual connection to the user destination. The control cells include an explicit rate field that defines an explicit rate, which may or may not accurately reflect the actual cell transmission rate. At each switch, a Fair Share cell transmission rate is determined as a function of a programmed maximum cell transmission rate of the transmission link, e.g., the physical port of the transmission link, coupled to the switch and the number of active data sources with virtual connections through the transmission link. The present invention may be employed whether or not an actual determination of congestion is made at the switch.

The number of virtual connections is determined by counting the actual number of virtual connections from user cells transmitted through the switch using virtual connection data in user cells. Preferably, the count of the number of virtual connections is changed to a higher power of two to simplify the calculation of the Fair Share cell transmission rate. The change is preferably effected by incrementing the count to the next higher power of two. The determination of the Fair Share transmission rate is preferably effected by dividing the maximum cell transmission rate of the physical port coupled to the switch by the number of virtual connections through the physical port. The explicit rate in the control cells is changed to the Fair Share cell transmission rate, preferably only if it is lower than the explicit rate. The control cells are returned to the user source, and the current cell transmission rate is changed to the Fair Share transmission rate of the returned control cells.

FIG. 1 depicts a bit map representation of the ATM cell as presently defined in the specifications published by the ATM Forum. Each cell is 53 bytes (octets) in size, which includes a 5 byte header and a 48 byte payload. In the case of the data cell of FIG. 1, the payload is the data to be transmitted from the SES to the DES. The ATM cell header specifies fields including Generic Flow Control (GFC), the Virtual Path Identifier (VPI), the Virtual Channel Identifier (VCI), the Payload Type (PT), Cell Loss Priority (CLP) and Header Error Check (HEC), as next described.

Generally, the GFC field has local significance only and can be used to provide standardized local functions (e.g., flow control) on the customer site. The VCI and VPI fields are used to identify the virtual connections. The PT 5 field is used to indicate whether the cell contains user information or Connection Associated Layer Management (CALM) information. The CLP bit allows the user or the network to optionally indicate the explicit loss priority of the cell. The HEC field is an eight bit error correction code used by the physical layer for detection/correction of bit errors in the cell header, as well as for cell delineation as known in the art.

The RM cell of FIG. 2 is an example of a CALM cell.

The RM cell is an ATM cell having a specific payload format and therefore includes the standard ATM header. RM cells are indicated by the specific PT field (code point) with value 6 (e.g., binary encoding of 110). The RM Protocol Identifier byte is set to a value of "1" for ABR service (binary 0 0 0 0 0 0 0 1). The Message Type octet includes Bit Flags as shown in the following table:

| 8 | 7 | 6 | 5 | 4 | 3 | 2 | 1 |
|---|---|---|---|---|---|---|---|
| DIR | BN | CI | NI | RA | Res. | Res. | Res. |

The SES sets DIR=0 in forward RM cells and the DES sets DIR=1 in the backward RM cells to signify their direction in the transmission path. The SES also sets the Backward Notification (BN) bit to "0" to indicate an SES generated forward RM cell. In contrast, a Backwards Explicit Congestion Notification (BECN) RM cell may be generated by the network or the DES by setting BN=1 to indicate that the RM cell is not source generated and having DIR=1 to indicate the backward flow.

The SES initially sets Congestion Indication (CI) to "0" when it sends a forward RM cell. The CI bit of backward RM cells is set to "1" by an ATM switch or DES after determining congestion, as described below. Once CI is set to "1" by the DES or ATM switch, an ATM switch cannot change the CI bit from 1 to 0 and override determination of congestion. When backward RM cells having CI=1 is received by the SES, it decreases its ACR by a multiplication factor, as later described.

Setting CI=1 is also typically how a DES indicates congestion to the SES if the transmission path comprises ATM switches that can support only Explicit Forward Congestion Indicator (EFCI) marking and cannot calculate ER and stamp the RM cell ER field. This capability is included in the ABR specifications for backwards compatibility with older ATM switches that do not contain ABR RM cell processing capability.

RM cells generated by the SES are initialized with NI=0. The No Increase (NI) bit can be switched to NI=1 in a backward RM cell when an ATM switch senses impending congestion. When NI=1 in backward RM cells received by the SES, the SES is prevented from increasing its ACR. It should be understood that this mechanism might serve to provide an upper limit for transmission rates allowed pursuant, for example, to a service contract. However, in contrast to CI=1, NI=1 does not require any decrease in ACR. Like the CI bit, an ATM switch cannot change NI from 1 to 0 in backward RM cells that pass through it and override a determination of impending congestion.

The Request/Acknowledge (RA) bit is not used for ABR RM cells and is always set to "0" or a value prescribed in the ATM Standards. The remaining least significant bits are reserved for future use in the ATM standards at present.

The two byte ER field value is used to limit the SES to a specific transmission rate. The ER field in the forward RM cell is initially set by the SES to a predetermined rate (such as the PCR). It may be subsequently reduced by any ATM switch in the forward or reverse transmission path, to a value that the ATM switch can sustain. It may also be reduced by the DES, to a value that the destination can sustain.

The two byte Current Cell Rate (CCR) field is intended to be set by the SES to its current allowed user source transmission cell rate when it generates a forward RM cell, and the CCR field cannot be changed by network elements. The MCR field is also specified by the ATM standards body for optional use by ATM switches to facilitate bandwidth allocation. Since these are written by the SES, and the SES could intentionally or unintentionally fail to accurately state the actual cell rate or allocation, they are not employed in the practice of the present invention.

The QL and SN four byte fields are not used in the ABR service category and are set to fixed bit values. The next 30 bytes and six bits of the last two bytes are reserved for future designation. The final 10 bits are the Cyclic Redundancy Check (CRC-10) which are used for error checking.

The 16 bit CCR, MCR and ER fields contain rate values that are represented in a 16 bit binary floating point representation employing a reserved most significant 1 bit (not used and set to "0"), a 1 bit non-zero indicator, nz, a 5 bit exponent, e, and a 9 bit mantissa, m, as shown in the bit map of FIG. 3. If the nz bit is set to "0", the rate is always set to zero. Normally, nz=1, and the rate is determined in a floating point calculation in accordance with the formula:

$$R=[2^e (1+m/512)] * nz \text{ cells/sec}$$

As described further below, this 16 bit floating point format is to be interpreted and used in all calculations at the SES, DES, and ATM switches. The final value received in backward RM cells at the SES is used by the SES to control the transmission cell rate.

Figure 4:
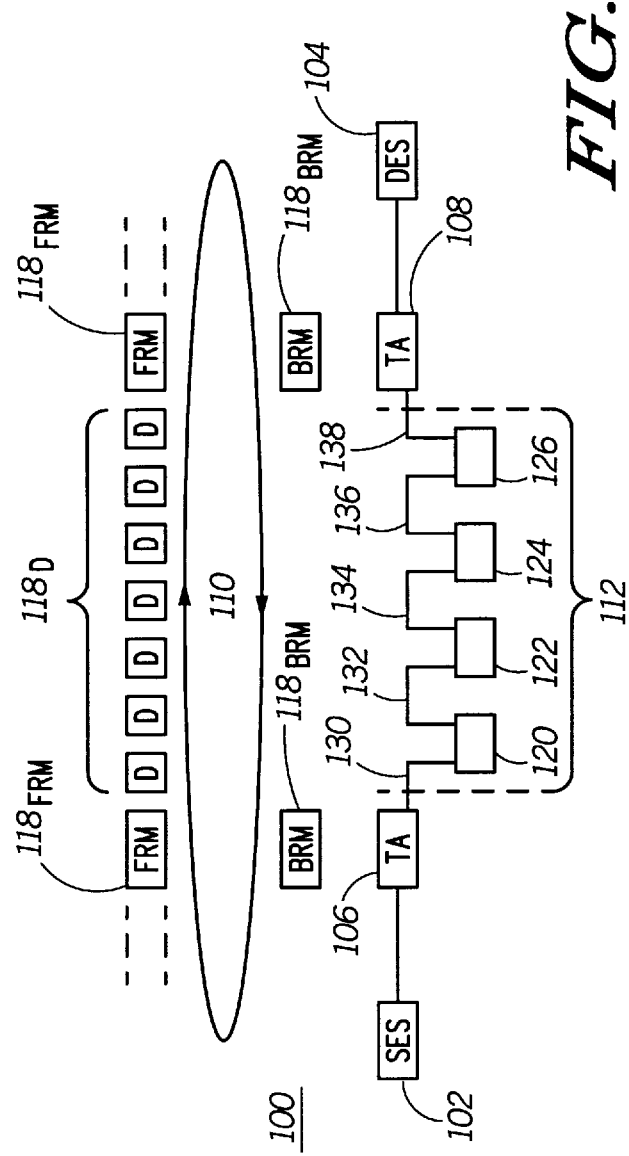
FIG. 4 shows a schematic system diagram illustrating components of an ATM network and a VC through it, in accordance with the present invention.

An exemplary transmission path and VC for ATM user cells established between an SES and a DES of a cell based network or ATM network 100 are illustrated schematically in FIG. 4. The ABR SES 102 and ABR DES 104 generate and receive all of the ATM traffic categories. In particular, FIG. 4 illustrates that an ABR transmission uses VC 110, in which the forward ABR user cells 118 are transported at the cell rate through the bidirectional end-to-end VC 110 in the ATM network 100. The user source or SES 102 and DES 104 typically include network interface cards or Terminal Adapters (TAs) 106 and 108, respectively, that form the extreme points of a VC 110 when a connection is made through the transmission path 112. The transmission path 112 may include one or more ATM switches 120, 122, 124, 126, etc. coupled together by transmission links 130, 132, 134, 136, 138, etc., for example, through which the VC 110 is made between the SES 102 and the DES 104. The elements of the transmission path 112 may have a wide variety of bandwidths within the ATM specifications, as described below.

Assuming a single control loop VC 110 as shown, the VC 110 is routed through the transmission path 112 and includes a forward direction (from SES to DES) transmission loop and a backward direction (from DES to SES) rate-based feedback loop. For bidirectional point-to-point connections, the forward and backward directions of an ABR VC 110 use the same connection identifiers, and pass through identical transmission facilities. A distinguishing feature of the SES 102 and its TA 106 of the ABR category is its ability to submit cells into the network transmission path 112 at a variable, but controlled and shaped, cell rate. The SES 102 and DES 104 also must form the two ends of the ABR control loop wherein the SES 102 transmits ABR user cells 118 including the forward RM cells $118_{FRM}$ for conveying feedback information interspersed with data cells $118_D$ toward the DES 104 in the forward path. Similarly, the DES 104 returns the backward RM cells $118_{BRM}$ towards the SES 102 in the feedback loop of VC 110. This can be accomplished by having the DES loop back the forward RM cells $118_{FRM}$ as backward RM cells $118_{BRM}$ after modification of the RM cell content by the DES, i.e., the DIR bit, and optionally the ER field to lower the rate for DES congestion, in accordance with the invention.

The ATM switches, e.g. ATM Switch 120, provide the necessary, albeit limited, resources for storing, switching (i.e., between multiple links), and forwarding all ATM traffic categories, including the ABR data and RM cells 118, from SES 102 to DES 104, these switch resources including port bandwidth and cell buffers that provide a maximum cell transmission rate. Furthermore, the transmission links 130–138 shown in FIG. 4 have limited resources or bandwidths that also provide a maximum cell transmission rate at the physical ports thereof, as described further below. These too are limited resources, the contention for which may lead to congestion in the form of loss or excessive delay of ATM user cells. Since ABR traffic has a lower priority than CBR and VBR traffic in other VCs sharing these resources, the ABR traffic cell transmission rates of ABR VCs using these resources is modified to thereby reduce congestion. Each ATM switch 120, 122, 124, 126, etc. in a VC 110 must monitor the usage of its resources to provide proper feedback to the SES 102. The feedback includes setting CI=1 and/or rewriting the ER field of backward RM cells $118_{BRM}$ with Fair_Share values which, when observed at the SES TA 106, causes it to conform the ACR of ABR cells 118 to the Fair_Share value, thereby providing rate-based, closed-loop, flow control in VC 110 in a manner described more completely below. Conventionally, the ER field is rewritten each time the backward RM cells $118_{BRM}$ pass through an ATM switch 120, 122, 124, 126, etc., even if there is no congestion in the ATM switch or a transmission link attached to it.

In this context, one embodiment of the present invention simplifies the calculation and updating of the ER field in RM cells at ATM switches in the forward or backward direction of transmission of the RM cells in the VC. In a preferred embodiment, these actions are only initiated in the presence of congestion.

Figure 5:
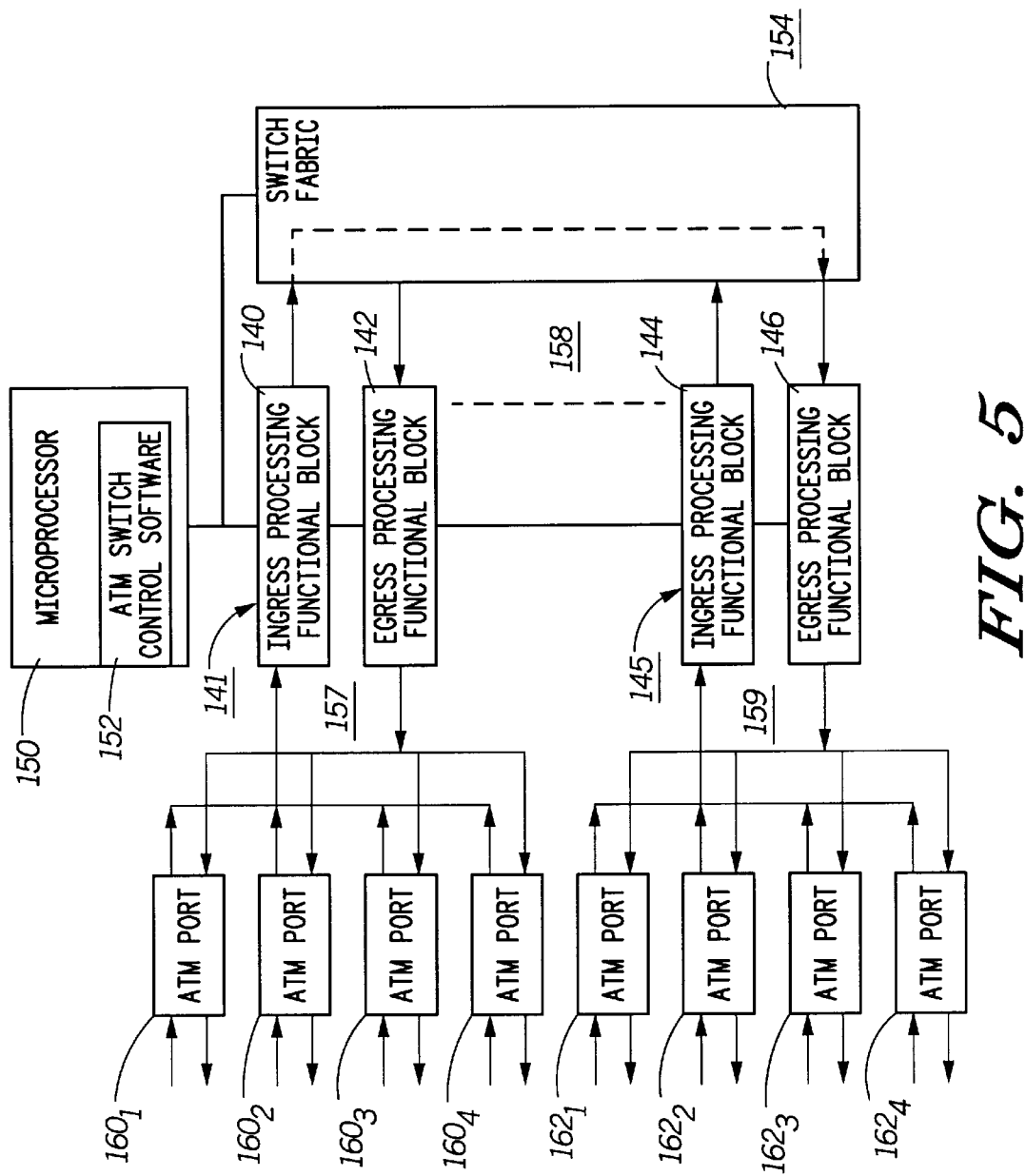
FIG. 5 shows a high level functional block diagram of the components of an ATM switch, in accordance with the invention.

FIG. 5 shows a high level functional block diagram of a representative ATM switch, in accordance with the present invention. As shown, the ATM switch, e.g. ATM switch 120 of FIG. 4, is coupled to Ingress physical ports $160_1$–$160_4$ and Egress physical ports $162_1$–$162_4$ through an interface as described below. ATM switch 120 comprises major functional blocks including Switch Fabric 154, at least one Ingress Switch Port 141 and at least one Egress Switch Port 145 for directing ATM traffic categories through the Switch Fabric 154, and a microprocessor 150 having ROM and RAM and containing ATM switch control software 152. A microprocessor interface 164 is used by the system's microprocessor 150 for configuration, control and monitoring of the Ingress and Egress Switch Ports and the Switch Fabric 154 functional blocks.

The Ingress and Egress Switch Ports each include an Ingress Processor and an Egress Processor pair. For example, two Switch Ports, namely Ingress Switch Port 141 and Egress Switch Port 145, are depicted in FIG. 5 comprising the Ingress/Egress Processor pairs 140, 142 and 144, 146, respectively. As is known in the art, the number of Switch Ports in an ATM switch 120 might be greater than the two shown here for clarity. In the forward direction, an Ingress Switch Port 141 receives ATM cells from an ingress transmission link, e.g. ingress transmission link 130 of FIG. 4, and directs the ATM cells to the Switch Fabric 154 as described below in detail. An Egress Switch Port 145 transmits ATM cells from the Switch Fabric 154 in the forward direction to an egress transmission link, e.g. transmission link 132 of FIG. 4. In the forward direction, the ATM cells are directed to a DES or another ATM switch at the other end of the egress transmission link. The "Ingress"

and "Egress" convention is employed in the following description in relation to the forward direction of ATM user cell traffic flow, unless the backward direction, particularly the backward direction of the backward RM cells, is specifically identified.

The Ingress/Egress Processor pairs 140, 142 and 144, 146 provide ATM Layer functions such as shaping, scheduling, queuing, congestion control and certain diagnostic cell handling functions, as later described. The Ingress/Egress Processor pairs 140, 142 and 144, 146 are each connected through ATM physical (PHY) interface networks 157, 159 to a number (e.g., four in this illustrated case) of Ingress physical ports $160_1$–$160_4$, and Egress physical ports $162_1$–$162_4$, respectively. In a preferred embodiment, the PHY interface networks 157, 159 preferably use the well defined ATM Forum UTOPIA standard interface. Additional physical ports, up to six for example, can be connected to any Ingress or Egress Switch Port using the Multi-PHY features of the supported ATM Forum UTOPIA standard PHY interface. The VC capacity of each Switch Port is limited to a maximum number, e.g., 2048, providing a maximum number of virtual connections that can be handled by a single Switch Port. This number may be divided between the number of physical ports attached to a given Switch Port. For convenience, the subscripts designating the number of physical ports 160, 162 will be omitted in the following description except as pertinent in the particular context.

The physical ports 160, 162 are also referred to as physical layer entities and are attached to the bidirectional ATM transmission links between SES TAs, ATM switches and DES TAs of FIG. 4. As will be understood by those skilled in the art, physical ports 160, 162 might comprise a SONET framer with a Physical Media Dependent (PMD) protocol, optical OC-3 interface operating at 155.52 Mbps or can be a TC-25.6 desktop ATM interface operating at 25.6 Mbps. These maximal operating speeds or bandwidths are specified by various standards organizations such as the ITU, and impose, for purposes of implementation, specific maximal cell transmission rates that can be utilized on any specific ATM link. Other physical port interface standards implementing other link rates are also commonplace. For purposes of the present invention, a maximum cell transmission rate, or Link_BW, is defined that is equal to the industry specifications for the particular physical port. The Link_BW value is communicated by the microprocessor 150 to Egress context memory of the egress switch port it is connected with during configuration of the ATM network. The Link_BW value is used by the Egress Cell Processor to limit the aggregate peak cell rate of all VCs sent to a specific physical port. The Link_BW value is also used by the microprocessor 150 in the calculation of other control values (i.e., Rate_Threshold and Excess_BW), as discussed below.

The ATM Ingress and Egress Switch Ports 141 and 145 preferably operate at a common nominal specified rate, say 155.52 Mbps, or 622 Mbps. The ATM physical ports 160, 162 preferably operate at the same rate as the Ingress and Egress Switch Ports 141 and 145 (e.g., if there is a single physical port attached to each such Switch Port), or at a rate of 1/N times the switch port rate (or less) if there are N physical ports attached to a specific Switch Port. For example, if the Switch Ports 141, 145 are each operating at 155.52 Mbps, then up to six physical ports 160, 162 operating at a speed of 25.6 Mbps (or less) can be attached to a single Switch Port. In reference to FIG. 5, a particular physical port $162_{[i]}$, for example, among the four physical ports 162 attached to the egress switch port 145 may become "rate congested" whenever the instantaneous sum of the rates of all VCs directed towards the particular physical port $162_{[i]}$ exceeds the physical port maximum cell transmission rate Link_BW.

In a preferred embodiment, rate congestion is determined by measuring the instantaneous cell rate of cells transmitted out of the Egress Processor 146 PHY interface in a given unit of time, comparing it to a rate congestion threshold, Rate_Threshold, and declaring the physical port to be rate congested whenever the instantaneous rate exceeds the threshold. Typical rate threshold values used in a preferred embodiment are the programmed Rate_Threshold, which is preferably set to approximately 85 to 95 percent of the specified cell transmission rate of the physical port, Link_BW.

In FIG. 5, the Ingress and Egress Processors 140, 142 and 144, 146 connect to the Switch Fabric 154 through a Switch Fabric Interface 158, which is part of the ATM switch architecture. Additional Ingress Switch Ports 141 and Egress Switch Ports 145 may be coupled with Switch Fabric 154 using the Switch Fabric Interface 158. The Switch Fabric 154 may be considered a shared bus extending between Ingress Switch Ports and Egress Switch Ports 141, 145, etc. (other switch fabrics could be used, such as cross point switch fabric, fully inter-connected mesh switch fabric, Banyan switch fabric, etc.) coupled to it through the Switch Fabric Interface 158. The switch fabric 154 typically operates in "cell cycles." In the example of FIG., 5, for every cell cycle, one cell at most can arrive at each Ingress Switch Port 140 and one cell at most can be dispatched from each Egress Switch Port 146. Each cell cycle, a newly arrived cell, if any, is stored in a virtual connection queue, or per-VC queue, in the cell memory in the Ingress Switch Port 141.

Figure 6:
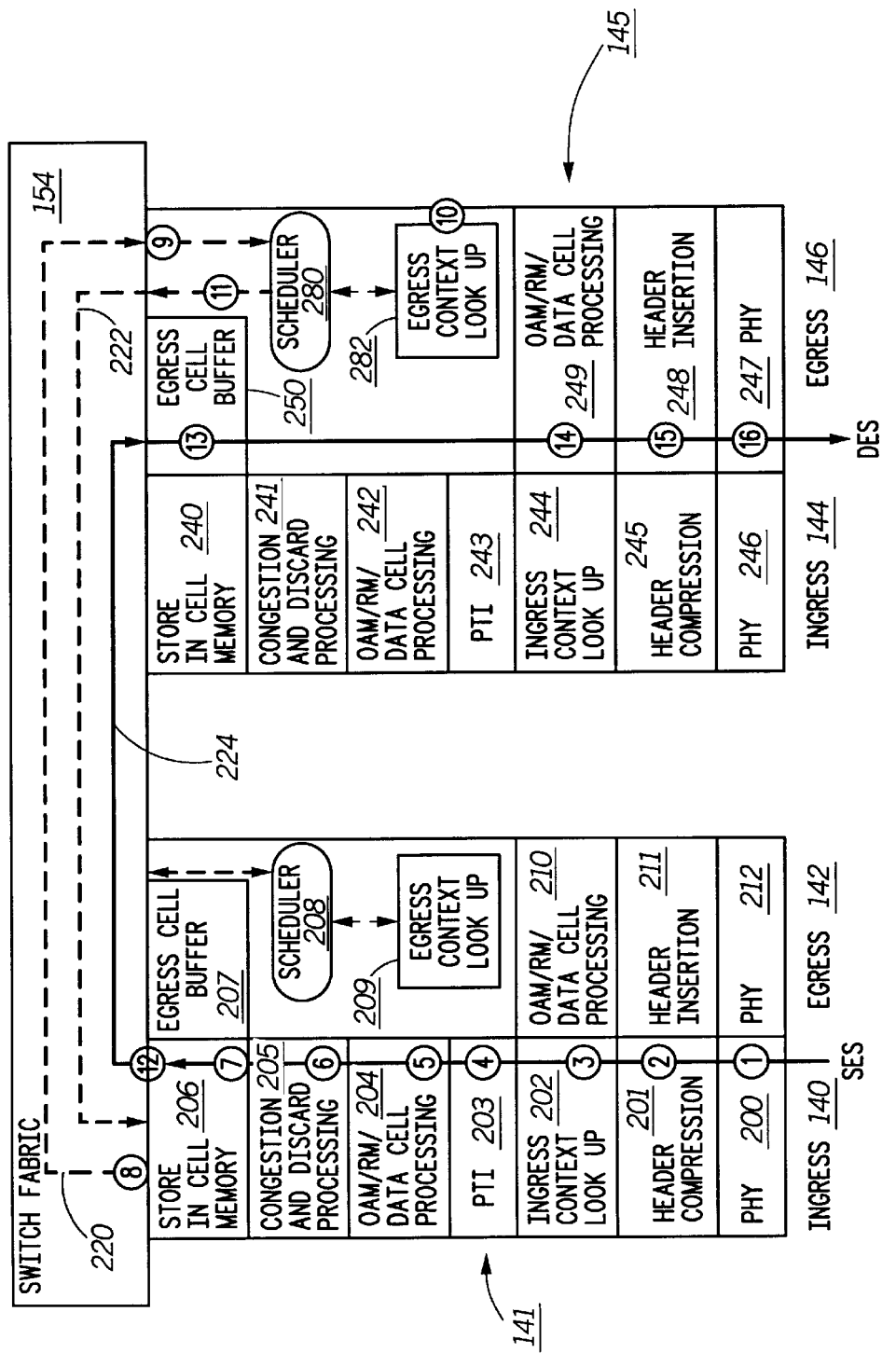
FIG. 6 shows a high level overview of ATM cell processing through the ATM switch shown in FIG. 5.

The operations of the ATM Switch 120 in processing all categories of ATM user cells in a VC and the determination of such congestion are first explained in a step-by-step fashion with respect to FIG. 6 as follows. At step 6-1, an ATM cell is received at the PHY stage 200 of Ingress Processor 140 from an Ingress physical port $160_1$–$160_4$. A PHY_Index number is applied to the cell identifying the number of the Ingress physical port $160_1$–$160_4$. Cells identified as from disabled Ingress physical ports are discarded.

At step 6-2, the PHY_Index and the 28 bit ATM address in the cell header (i.e., the VPI and VCI fields) are read in Header Compression stage 201. An ingress connection identifier (ICID), a small integer, for example, 14 bits, is computed by the header compression stage, as a predetermined function of the PHY_Index and the 28 bit ATM address. This ICID is used as described below to identify the VC connection queue to which the cell is directed and for local and global ingress congestion processing.

At step 6-3, the ICID is used in Ingress Context Look Up stage 202 as an address to address the ingress context memory 292 (FIG. 8) in Ingress Processor 140. The ingress context memory contains all information associated with the connection that is required by the Ingress Processor 140.

At step 6-4, in the PTI stage 203, the 3 bit "PTI field" in the received ATM cell is processed to determine its type, e.g., user data cell, diagnostic cell, RM cell, first cell of a user data frame, etc.

At step 6-5, the OAM/RM/Data Cell Processor 204 then performs any data processing that is required on the identified cell type. This step includes such things as processing diagnostic cells (referred to as an Operation, Administration and Maintenance or OAM cells), forward RM cells and data cells of ABR traffic. Forward RM cell processing is described further below in regard to FIG. 7.

At step 6-6, the Congestion and Discard Processing stage 205 then performs local congestion determination for the ATM traffic category. Local congestion is declared whenever the number of ATM cells stored in the per-VC queue in Cell Memory within Ingress Switch Port 141 exceeds a predetermined local congestion threshold for that VC queue. If the VC queue is declared to be locally congested, and if the EFCI option has been enabled for the VC (selectable on a per VC basis), then the EFCI bit in the PTI field of ATM user cells is set (which could be ABR traffic user cells). In accordance with a feature of the present invention, the ABR traffic is treated differently by the setting of an ER Decrease bit which is described below.

The local congestion threshold is preferably a programmable value and is preferably a percentage of the total number of 53-byte buffers devoted in Cell Memory 206 to a per-VC queue. In practice, whenever in a cell cycle that the number N of buffers of a per-VC queue $290_{[i]}$ filled with ATM cells is found to exceed the local congestion threshold LCth, (i.e., N>LCth) then local congestion of that VC queue is declared in step 6-6. The local congestion threshold value used on a dynamic basis is also preferably one of two different predetermined threshold values. A lower local congestion threshold value, LCthl, can be substituted for the normal local congestion threshold value, LCthn, whenever the cell buffers of Cell Memory 206 are determined to be globally congested as described further below.

Global congestion of the Cell Memory 206 is determined to exist whenever the total number of free cell buffers in all of the VC queues of Cell Memory 206 drops below a programmable global congestion threshold GCth. The global congestion threshold is also preferably defined as a fraction of the total number of cell buffers and is supplied by the ATM switch microprocessor 150. Stated another way, global congestion of the Ingress Cell Memory 206 is determined as a function of the total number of user cells in all virtual connection queues.

It should be noted that local congestion (i.e., per-VC) thresholds ensure fairness to network users, while global thresholds limit the memory size (e.g., ingress cell memory). Additionally, the rate control mechanism at the egress switch port provides a means to fine-tune the utilization at the output links and offers finer control over ingress cell memory size. That is, due to the unique nature of the preferred architecture, both the ingress and egress ports should be monitored for congestion to achieve the best results.

Step 6-6 also includes cell discard based upon severe local congestion of the per VC queue depth. Declaration of severe local congestion is a predetermined function of the number of ATM cells stored in the per-VC queue, the total number of free Cell buffers remaining in the Cell memory 206, and the CLP bit in the received ATM cell. If the VC queue is declared to be severely congested, then the ATM cell is discarded; otherwise, it enters its VC queue 2901–290n for its traffic category.

At step 6-7, the ATM cell of the VC is then stored in the appropriate per-VC queue 2901–290n (FIG. 8) in the Cell Memory 206 of the Ingress Processor 140 (assuming it wasn't discarded by the previous step). The per-VC queue depth and the local and global congestion flag states are updated in the Ingress context memory 292.

If the per-VC queue depth was incremented from 0 to 1 in step 6-7, then at step 6-8, the Ingress Processor 140 broadcasts arrival information 220 to the Egress Processors of all Egress Switch Ports coupled to the Switch Fabric 154. The arrival information includes the parameter "Primary" (a small integer specifying the primary destination Egress Switch Port) and the Egress Context Identifier (ECID) which is used to address the per VC egress context table in the Egress Switch Port. All Egress Switch Ports, e.g. Egress Port 145, listen to the arrival information 220 broadcasts and pick up the broadcasts that are addressed to them. In the illustrated example of FIG. 6, at step 6-9, the Scheduler 280 in the Egress Processor 146 of the addressed Egress Switch Port 145 receives the arrival information 220.

At step 6-10, the Egress Context Look-up Memory 282 is addressed by the Scheduler 280 using the ECID in order to retrieve Scheduler state information to be used by the Scheduler 280 to schedule the current cell request at some future desired transmission time, using the state information associated with the VC (addressed by the ECID). The Scheduler 280 schedules ATM cells in the dedicated per-VC queues of one of more Cell Memories 206 of one or more Ingress Processors 140 for delivery over the Switch Fabric 154 in the proper time order to guarantee the QoS for the various ATM traffic service categories supported (i.e., CBR, VBR, ABR, and UBR). It should be noted that Scheduler 280 is described in further detail in pending patent application CX095035, entitled "Event-Driven Cell Scheduler and Method for Supporting Multiple Service Categories in a Communication Network", and assigned to the assignee of the present invention. The Egress Context Look-up Memory 282 also contains the VPI and VCI fields associated with the ECID for update of the cell header in step 6-15 described below.

At step 6-11, at the proper time in the cell request cycle, the Scheduler 280 generates a cell request 222 including a Qport (a small integer specifying the Ingress Switch Port 141) and the ICID and transmits it to the identified Ingress Switch Port 141. The plurality of Switch Ports (141, 145, . . .) connected to switch fabric 154 perform an arbitration function in order to contend for possibly limited switch fabric bandwidth, and possibly limited cell memory 206 bandwidth. If the cell request 222 fails to elicit a response, then the Scheduler 280 will repeat the cell request 222 in the next cell cycle.

At step 6-12, the addressed Ingress Processor 140 receives the cell request and transmits an ATM cell 224 from the requested VC queue (as specified by the ICID in the request cell message of FIG. 8) to the Switch Fabric 154. The Ingress Processor 140 also attaches additional information (a so-called switch header) to the transmitted ATM cell 224 which, in the case of ABR user cells, contains, among other things, an ER-Decrease bit, as well as an indication of queue depth, as later described. For other traffic categories, the EFCI bit may be set to indicate ingress cell memory congestion. The Ingress Processor 140 also decrements the queue depth count for the VC queue and updates the global congestion state.

At step 6-13, the Egress Cell Buffer 250 in Egress Processor 146 receives the ATM cell 224 from the Switch Fabric 154, retains it in a buffer of Egress Cell Buffer 250, and performs rate congestion determination described below. The Egress Cell Buffer 250 also determines if the ER-Decrease bit is set in the switch header appended to the received ATM cell 224 and retains it for performance of the ER-Decrease functions described below in reference to step 7-6 of FIG. 7. Further, the queue depth indication is stored in the egress context memory 282, for use as later described.

At step 6-14, the OAM/RM/Data Cell Processor 249 performs any processing that is required of ATM cells associated with the VC connection, e.g., calculation of CRC-10 (see FIG. 2) for all RM cells. Other processing, not pertinent to the present invention, might also be performed by this stage.

At step 6-15, the Header Insertion stage 248 then retrieves the GFC, VPI and VCI field data associated with the ICID of the ATM cell 224 from the Egress Context Look-Up Memory 282 and inserts them into the ATM cell header.

The PTI and CLP fields or bits are provided with the ATM cell. A dummy HEC byte is inserted into the ATM cell field that will be re-written by the ATM Port $162_{[i]}$.

At step 6-16, the PHY stage 247 of the Egress Processor 146 controls the transmission of the ATM cell via the UTOPIA interface to the appropriate Egress physical port 162 (of FIG. 5). At this point, the ATM cell is transmitted by the ATM switch 120 into the downstream transmission link coupled to the Egress physical port 162 and routed toward the DES.

Figure 8:
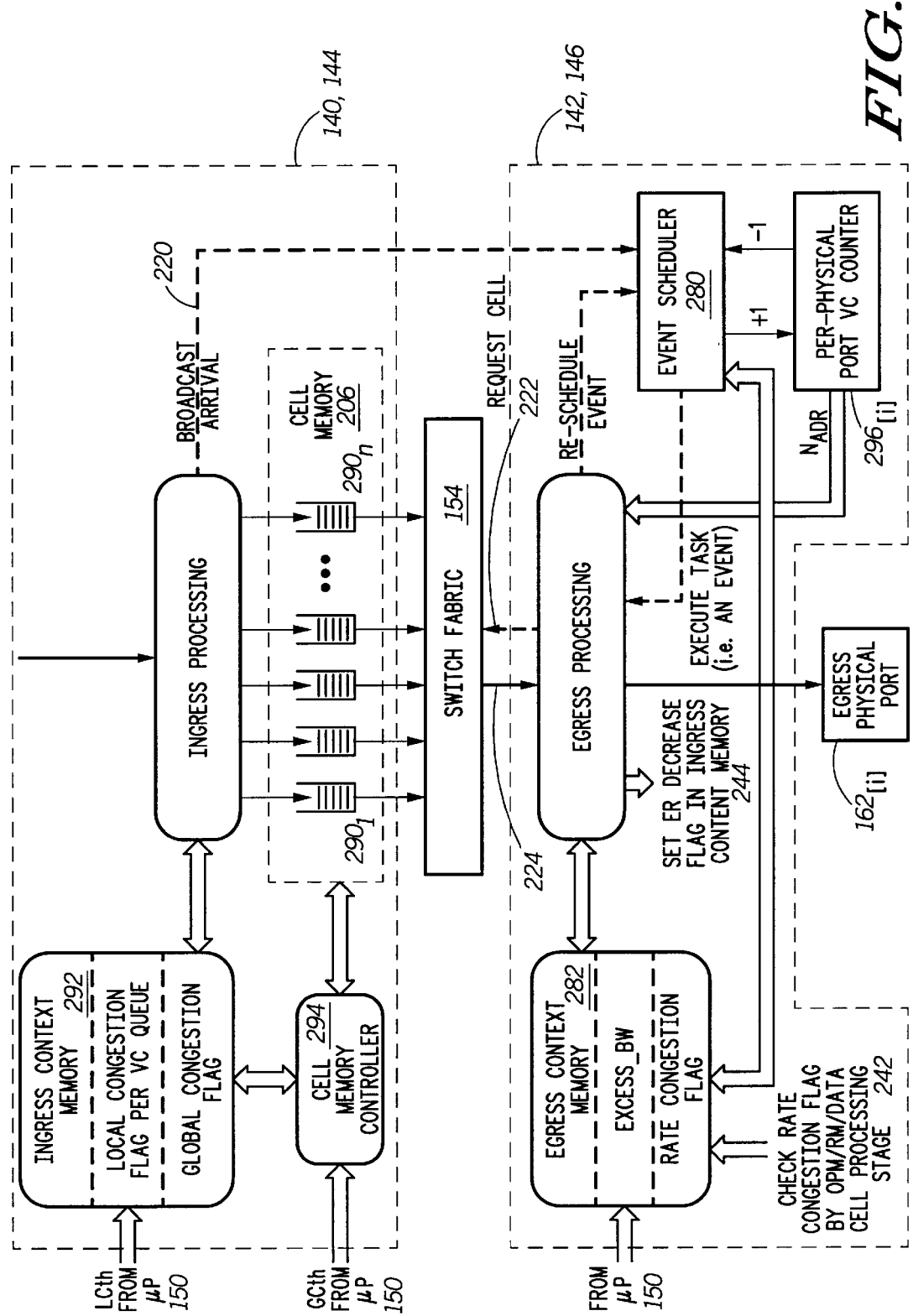
FIG. 8 shows a schematic view of the components and operations of an ATM Switch in processing forward ATM traffic categories and determining local and global congestion of Ingress Cell Memory per-VC queues and rate congestion of physical ports attached to the Egress Processor of the Egress switch Port.

Returning to step 6-13, the determination of rate congestion takes place as follows. A rate threshold parameter (Nrate_threshold) and a rate threshold measurement period (Nrate_window) are programmable for each Egress Switch Port, including Egress Switch Port 145 and maintained in Egress context memory 282 (FIG. 8). Also, a pair of up counters or registers (referred to as "window[phy_index]" and "rate[phy_index]" for each Egress physical port $162_{[i]}$ attached to the PHY stage 247 at the output of the Egress Processor (e.g., 1 to 6 pairs of registers) are maintained in Egress context memory 282. Each time an ATM cell is processed by the Egress Cell Buffer 250, the following processing is performed to determine rate congestion:

1) The register in Egress context memory 282 associated with the particular VC is read by Egress Cell Buffer 250 to fetch an "include_in_rate" bit that identifies the VC to be included in the rate congestion calculation (for example, UBR VCs are not included due to the hierarchy) and a "phy_index", identifying the physical port.
2) The counter "window[phy_index]" associated with the physical port 162 (1, 2, 3, . . . 6) identified by phy_index of step 1) is unconditionally incremented by one.
3) If the include_in_rate bit is set, then the counter "rate[phy_index]" is conditionally incremented by one. Note: the include_in_rate bit is normally set for CBR, VBR, and ABR connections, and cleared for UBR connections.
4) If the incremented count of counter "window[phy_index]" is less than the predetermined parameter Nrate_window, then all further processing is stopped.
5) If not, the count of counter "rate[phy_index]" is compared to the parameter Nrate_threshold. If the rate[phy_index] count is greater than or equal to Nrate_threshold, then a "rate congestion flag" is set for the physical port identified as "phy_index" in step 1). If not, the "rate congestion flag" for that physical port is cleared.
6) On completion of 5) above, the two counters "rate[phy index]" and "window[phy index]" are cleared.

In practice, the Nrate_window is set as a number of cells determined as the product of the physical port bandwidth and a selected measurement period divided by the number of bits in a cell (53 octets * 8 bits per octet=424 bits). For example, if the selected measurement interval is 1 millisecond and the Egress Switch Port 145 has one 150 Mbps physical port attached, then the Nrate_window should be set to:

$$0.001 * 150 * 10^{+6}/424 = 354 \text{ cells}$$

This would result in a measurement period of 1 millisecond, and the rate congestion flag for the physical port would be updated once every millisecond.

The parameter Nrate_threshold is set at a percentage of the measurement period. For example, if the desired rate threshold setting is 85%, then the parameter Nrate_threshold is set at 85% of the value of Nrate_window. For the above example, this would be the following:

$$354 \text{ cells} * 0.85 = 301 \text{ cells}$$

Thus, the physical port $160_i$ would be declared to be rate congested if 301, or more of the 354 cell slots are used to transmit ATM cells which are of the CBR, VBR, or ABR service categories. The rate congestion flag is maintained in Egress context memory 282 (see FIG. 8) in Egress Processor 146 identifying the physical port for use by the OAM/RM/Data Cell Processing stage 242 as described below.

At step 6-11 above, the Scheduler 280 calculates $N_{ABR}$ (number of active ABR VCs per physical port) in the per-physical port active VC counter 296[i] in the manner described below. The Scheduler 280 contains a means for determining if a VC of the ABR service class is "active", or "idle". The "idle" state is declared whenever the per-VC ATM cell queue in the Cell Memory 206 in the Ingress Processor 140 has been empty for a time exceeding a predetermined time interval (typically, 10 ms). Whenever the Scheduler 280 changes the state of a VC from the "idle" to "active" state, the Scheduler 280 increments the count $N_{ABR}$ maintained in a per-physical port active VC counter 296[i] for the corresponding physical port 162[i] by "one". Whenever the Scheduler 280 changes the state of a VC from the "active" to "idle" state, the Scheduler 280 decrements the count $N_{ABR}$ for the corresponding physical port by "one". Thus, the per-physical port active VC counter 296[i] contains a number $N_{ABR}$ which is equal to the number of ABR VCs which are in the "active" state.

In accordance with the preferred embodiment of the present invention (and in reference to FIG. 8), the count or $N_{ABR}$ of VCs through a physical port 162[i] is determined in the following manner:

1) The Scheduler 280 maintains one counter value $N_{ABR}$ for each Egress physical port 162[i] attached to the PHY stage 247 at the output of the Egress Processor 146 in a per-physical port VC counter 296[i]. Thus, in the present embodiment, the Scheduler 280 maintains up to "six" counter values ($N_{ABR[i]}$, i=0, 1, 2, 3, 4, 5) depending on the actual number of physical ports (1–6) that are attached.
2) The counts are initialized to a $N_{ABR}$ value of zero.
3) The per-VC Egress Context memory 282 contains a per-VC "active" bit flag, indicating that the VC is presently active ("active=1") or not active ("idle=0"). The per-VC "active" bit flag is initialized to a value of "0" indicating that the per-VC queue is initially not active.
4) The per-VC Egress Context memory 282 also contains a per-VC time stamp, "last_request", indicating the time instant that the Scheduler 280 last "requested" an ATM cell from the per-VC queue (refer to step 6-11). The initial value of the per-VC time stamp is "don't care".
5) Upon receiving arrival information 220, indicating that a "first" ATM cell has arrived at the per-VC ATM cell queue in Cell Memory 206, the Scheduler 280 schedules a "request" for some future desired time instant (refer to step 6-8 through 6-10). The Scheduler 280 also tests the per-VC "active" bit flag in the Egress context memory 282. If the bit flag is "0", then the Scheduler 280 sets the "active" bit flag to "1" and also increments the value of $N_{ABR[i]}$ for the corresponding physical port 162[i].
6) At the "desired time", or sometime thereafter, the Scheduler 280 "requests" an ATM data cell (refer to step 6-11 above).

7) At step 6-11, the Scheduler 280 tests the "queue depth counter" value in the Egress context memory 282 (refer to steps 6-12 and 6-13 above). If the value is non-zero, the Scheduler 280 decrements the value and schedules another "request" for some future desired time instant (essentially repeating step 5 above).

8) A "background" process of the Scheduler 280 scans the Egress context memory 282 for all VCs.

Whenever it finds a VC for which:

the queue depth variable is "zero";

the "active" bit is "1"; and the "last_request" is greater than or equal to a predetermined time period (typically on the order of 10 milliseconds), then the Scheduler 280 does the following:

clears the active bit; and decrements the counter value $N_{ABR[i]}$ for the corresponding physical port.

In the context of ABR traffic category illustrated in FIG. 4, the ATM switch 120 receives ABR user cells at an Ingress Processor 140, for example, of Ingress Switch Port 141 and transfers the intermixed data and forward RM cells to an Egress Processor 146 of Egress Switch Port 145 in the direction of the DES. The backward RM cell $118_{BRM}$ is received at the Ingress Processor 144 of the Egress Switch Port 145 and transmitted through the Switch Fabric 154 to the Egress Processor 142 of the Ingress Switch Port 141 in the direction of the SES.

Figure 7:
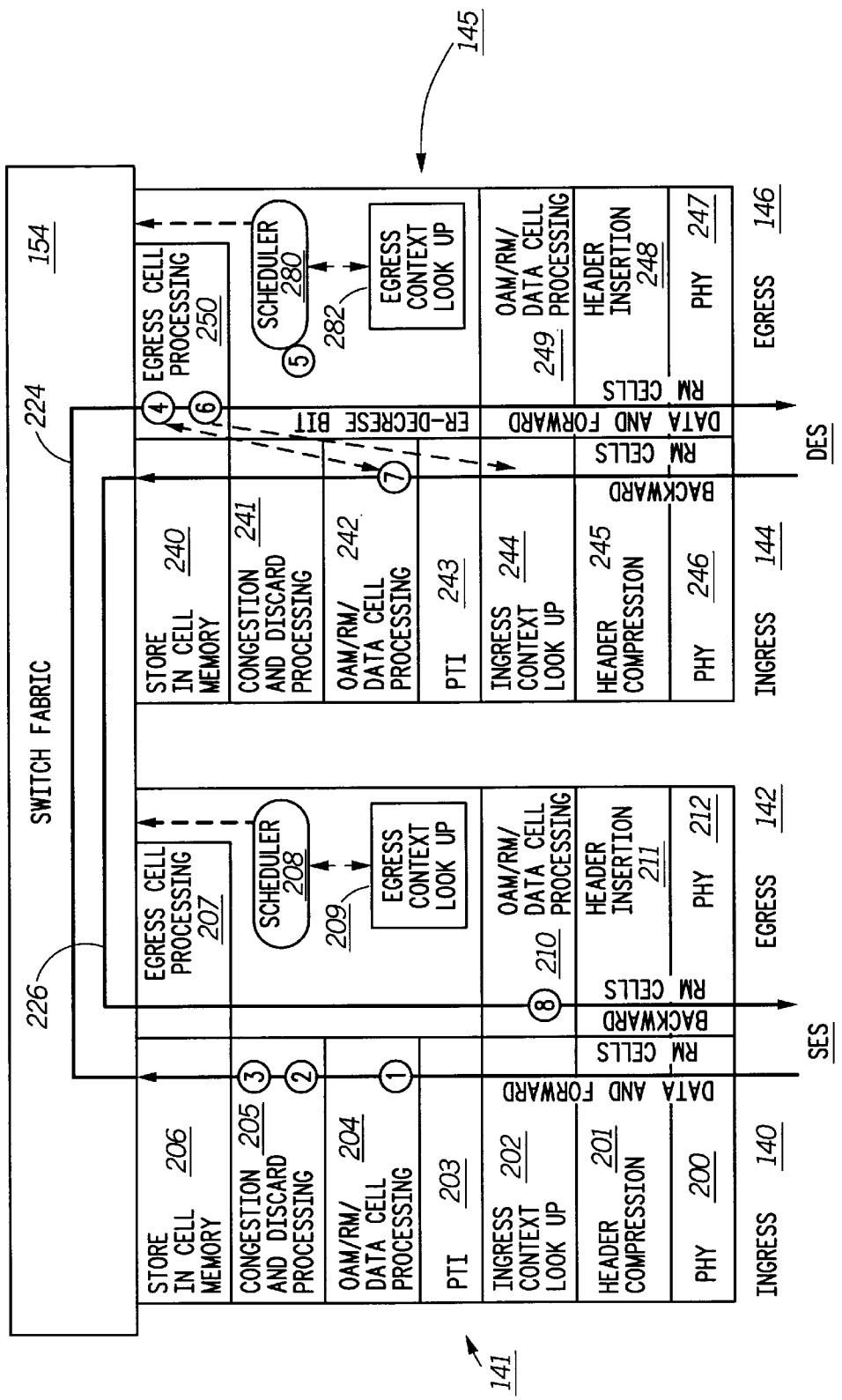
FIG. 7 shows a view of forward and backward RM cell processing through the ATM switch of FIG. 5.

Turning now to FIG. 7, it more specifically illustrates the operation of the ATM switch 120 in processing ABR service category, forward data cells $118_D$, forward RM cells $118_{FRM}$ and backward RM cells $118_{BRM}$ flowing in both directions simultaneously. As in FIG. 6, the cell flow of a VC is shown in FIG. 7 through ingress and egress transmission links (not shown) including respective ingress and egress physical ports coupled to the PHY stages 200, 212, 246, 247, but in both forward and backward loop direction.

In addition, FIG. 7 shows that the calculation of the Fair_Share value and the marking of the ER field of the backward RM cells $118_{BRM}$ takes place, in this depicted embodiment, in the presence of a set indication of congestion which is determined during each cell cycle for all ATM cells processed in the forward direction. Such congestion includes local or global congestion at the Ingress Cell Memory 206 or rate congestion in a physical port coupled to the Egress Processor 146. The determination of local or global Cell Memory 206 congestion and the marking of an ER-Decrease bit in the switch header of the respective transmitted cell 224 is described above with respect to steps 6-6 and 6-11 of FIG. 6. The determination of rate congestion is also described above.

The particular steps of processing ABR traffic forward and backward RM cells $118_{FRM}$ and $118_{BRM}$ and data cells $118_D$ in the presence of congestion are now described. Steps 7-1 through 7-5 of FIG. 7 are particularly explained in addition to or substitution for the forward ATM cell processing steps 6-1 through 6-11 to illustrate the functions in the presence of local or global congestion in the Cell Memory 206 or rate congestion in the egress physical port of the ABR VC coupled to the PHY stage 247 of Egress Processor 146 in accordance with the invention. In addition, the path of backward RM cell 226 is depicted in FIG. 7.

In the OAM/RM/Data Cell Processor 204 at step 7-1 (corresponding to step 6-5), the CRC-10 field of all forward RM cells are also checked for accuracy. If the CRC-10 field is incorrect, indicating inaccuracies occurring somewhere in the fields of the RM cell, then it is discarded.

At step 7-2, the Congestion and Discard processing operations of step 6-6 described above are performed for ABR user data and forward RM cells. Again, the local and global Cell Memory congestion states are determined at the occurrence of each ABR data and forward RM cell. If either state exists, then the "ER-Decrease" bit is set in the switch header appended to the forward transmitted cells 224 transmitted through the Switch Fabric 154 for use by the Egress Processor 146 as described below in step 7-6. It should be noted that while all ATM cell headers of all service categories are preferably marked with the ER-Decrease bit in the presence of local or global Cell Memory 206 congestion as described above, only backward RM cells are processed in accordance with the present invention to determine a Fair Share cell transmission rate and to mark the ER fields thereof with the Fair_Share value.

As in step 6-6 described above, at step 7-3, the Ingress Processor 140 also discards ABR data cells 118D and forward RM cells $118_{FRM}$ based upon severe congestion. Then, the ABR data cells $118_D$ and forward RM cells $118_{FRM}$ are processed in accordance with steps 6-7 through 6-12.

At step 7-4, the Egress Processor 146 checks for "rate congestion" on the Egress physical port 162 connected through the PHY stage 247 as described above. It should be noted that the above-described rate congestion determination process is conducted at each cell cycle for all categories of ATM traffic, not just ABR traffic, in all VCs through each of the Egress physical ports $162_1$–$162_n$ attached through the PHY stage 247 to the Egress Processor 146. However, in accordance with the present invention, only the ABR traffic categories are affected by the presence of congestion through the calculation of the Fair_Share value as described below and the marking of the backward control or RM cells $118_{BRM}$ only in the presence of rate congestion or Cell Memory 206 congestion.

At step 7-6, the Egress Processor 146 checks the ER-Decrease bit in the switch header of the received ATM cell. If the ER-Decrease bit is set to "1", the Egress Processor 146 marks the same VC in the reverse direction for an "ER decrease" operation in the Ingress Context memory 244 of the corresponding Ingress Processor 144 of the Egress Switch Port 145 for use in processing the next backward RM cell $118_{BRM}$ received for the same VC in step 7-7. The ABR cell is then processed in accordance with steps 6-14 through 6-16 described above and delivered to the physical port identified in the cell header.

At step 7-7, when a backward RM cell $118_{BRM}$ of the same VC arrives, the OAM/RM/Data Cell Processor 242 of the Ingress Processor 144 checks the Ingress Context memory 244 for an ER decrease flag for the same VC and for the rate congestion flag state of the associated egress physical port maintained in a buffer of the Egress context memory 282.

If either the physical port rate congestion flag is set (see step 7-4) and/or if the ER Decrease flag is set to 1 (see step 7-6), then the Fair Share cell transmission rate is determined as a function of a predetermined excess cell transmission rate (Excess_BW) of the corresponding Egress physical port and the number of ABR sources with VCs through the same physical port. The Ingress OAM/RM/Data Cell Processor stage 242 of the Ingress Processor 144 calculates the Fair_Share value and compares it to the ER field value. If the calculated Fair_Share value is less than the ER field value in the backward RM cell, then the Ingress OAM/RM/Data Cell Processor stage 242 overwrites the Fair_Share value in the ER field of the backward RM cell. This calculation is preferably only effected in the presence of congestion and not for every backward RM cell $118_{BRM}$.

In accordance with a further variation of the present invention, the simplified rate calculation as described below may alternatively be done every time a backward RM cell is processed at the Ingress OAM/RM/Data Cell Processor stage 242 without regard to whether either form of congestion is present. In other words, the local or global ingress cell memory congestion and/or rate congestion calculation may not be done, and the simplified cell transmission rate calculation may be conducted every time that the backward RM cell is processed in an Ingress Processor of an Egress Switch Port.

Whether or not the congestion conditions exist and the calculation is made, the backward RM cells $118_{BRM}$ are processed in stages 240, 241, 242, 243, 244, 245 and 246 of the Ingress Processor 144 in much the same fashion as the forward ATM cells are processed in the Ingress Processor 140 as described above. Similarly, the backward RM cells $118_{BRM}$ are transmitted through Switch Fabric 154 and received in Egress Cell Buffer 207 under the control of Scheduler 208 and Egress Context Look Up table 209 of the Egress Processor 142 in much the same fashion as the forward ATM cells are processed in the Egress Processor 146 as described above. At step 7-8, corresponding to step 6-14, the OAM/RM/Data Cell Processor stage 210 calculates and updates the CRC-10 field in all backward RM cells $118_{BRM}$ having changed the ER field values. The backward RM cells $118_{BRM}$ are then processed in header insertion stage 211 and PHY stage 212 in accordance with steps 6-15 through 6-16 described above and delivered to the physical port attached the PHY stage 212.

In the preferred calculation of the Fair Share cell transmission rate (step 7-7 above), the "excess cell transmission rate," is a cell transmission rate allocated to the sum of all VCs of the ABR service category on an Egress physical port. The allocated value is typically reduced from the physical link cell transmission rate (Link_BW) of the Egress physical port which is a physical band width limitation. Also in a preferred embodiment, the Excess_BW is the Link_BW decreased by an amount including the sum of the PCRs of all VCs of the CBR service category, the sum of the SCRs of all VCs of the VBR service category, and the sum of the MCRs of all VCs of the ABR service category, for all VCs which are supported by the physical port. Other rules for determining the excess cell transmission rate or Excess_BW may be used. In any case, the resulting Excess_BW is maintained by the control microprocessor 150 in the Egress context memory 282 as described above.

Furthermore, the "number of ABR sources with virtual connections through the same port" can be either the total number of ABR connections established through the physical port (known through call setup procedures), or the number of presently active ABR sources through the same port, as indicated by the parameter $N_{ABR}$ in step 7-5. Moreover, the "function of" is preferably the ratio of the "predetermined maximum cell transmission rate" divided by the "number of ABR sources". Denoting the maximum cell transmission rate by Excess_BW, then the calculated Fair_Share value is calculated as follows:

$$\text{Fair\_Share} = \text{Excess\_BW}/N_{ABR}, \quad (EQ\ 1)$$

where; Excess_BW is the per-physical port maximum cell transmission rate determined as described above, and $N_{ABR}$ is preferably the number of active VCs described above.

In the above calculation of the Fair Share cell transmission rate, specific simplifications in accordance with the preferred embodiment of the present invention are possible and desirable due to the need for very high speed computations as explained previously. In particular, the ER field in the RM cell is stored in the 16 bit binary floating point format illustrated in FIG. 3. Therefore, the calculation illustrated above must either be performed using floating point arithmetic, or else calculated using fixed point arithmetic and then converted to the 16 bit floating point format for comparison and updating purposes. In either case, a "division" is required (see EQ 1).

The following simplifications can be made in the calculations, resulting in the elimination of the need for the division, and replacing the need for a "division circuit" with a simple set of "counter circuits". These simplifications are possible when the number of ABR sources is rounded up to the next higher power of two. Rounding the number of sources up to the next higher power of 2 will tend to set the Fair_Share value to a value "lower" than EQ 1, which will be "conservative" in the sense that it will cause network congestion to be alleviated more rapidly by slowing the cell transmission rates of the VCs of the ABR service category passing through the congested queue and/or congested physical port.

The cell transmission rates are stated in terms of cells per second. In ATM systems, the number of cells per second can vary from a single cell per second (or possibly lower), to many millions of cells per second. For example, a 2.4 Gbps ATM link is capable of supporting approximately 5.6 million ATM cells per second. Encoding the cell transmission rates as binary integers would require 23 bits if this large dynamic range (i.e., 1 to 5.6e6) is to be accommodated. Higher speed ATM links are anticipated.

Because of this possibility, the ATM Forum (and ITU) chose to encode all rates using the floating point format. Using the floating point format, the ER in a RM cell can be expressed as the following:

$$\text{ER\_Cell} = (2^{EER}) * (512 + MER/512) \quad (EQ\ 2)$$

where;

ER_Cell is the explicit rate (cells per second)

EER is the five bit exponent field (0, 1, . . . , 31)

MER is the 9 bit mantissa field (0, 1, 2, . . . , 511)

Using this notation, the dynamic range of values, encoded into the 14 available bits (EER, MER) is from 1 cell per second to approximately 4.3 billion cells per second (approximately 1.8 trillion bits per second). Similarly, the Excess Bandwidth (Excess_BW), measured in cells per second can be expressed as a floating point number:

$$\text{Excess\_BW} = (2^{EEBW}) * (512 + MEBW/512) \quad (EQ\ 3)$$

where;

Excess_BW is the predetermined excess bandwidth expressed in (cells per second);

EEBW is a five bit exponent field (0, 1, . . . , 31);

MEBW is a 9 bit mantissa field (0, 1, 2, . . . , 511);

Also, the number of VCs of the ABR service category can also be expressed as a floating point number:

$$N_{ABR} = (2^{EN}) * (512 + MN/512) \quad (EQ\ 4)$$

where:

$N_{ABR}$ is the number of VCs of the ABR service category;.

EN is a five bit exponent field (0, 1, . . . , 31);

MN is a 9 bit mantissa field (0, 1, 2, . . . , 511);

Finally, the computed Fair_Share value can be expressed as a floating point number:

$$\text{Fair\_Share} = (2^{EFS}) * (512 + MFS/512) \quad \text{(EQ 5)}$$

where;

Fair_Share is the computed Fair Share transmission rate (cells per second);

EFS is a five bit exponent field (0, 1, . . . , 31);

MFS is a 9 bit mantissa field (0, 1, 2, . . . , 511);

Substituting EQ 3 and EQ 4 into EQ 1 yields:

$$\text{Fair\_Share} = \frac{(2^{EEBW}) * (512 + MEBW/512)}{(2^{EN}) * (512 + MN/512)} \quad \text{(EQ 6)}$$

or equivalently:

$$\text{Fair\_Share} = \frac{(512 + MEBW/512)}{(512 + MN/512)} * 2^{(EEBW-EN)} \quad \text{(EQ 7)}$$

Rounding the $N_{ABR}$ to the next higher power of two, is equivalent to setting MN equal to zero, and incrementing "EN" by one, or equivalently:

$$\text{Fair\_Share} = 2^{(EEBW-EN-1)} * (512+MEBW/512) \quad \text{(EQ 8)}$$

Comparing EQ 8 to EQ 5 one notes that the 5 bit exponent field of the computed Fair_Share value is equal to:

$$\text{EFS} = \text{EEBW} - \text{EN} - 1 \quad \text{(EQ 9)}$$

and the 9 bit mantissa field of the computed Fair_Share value is equal to the mantissa of the predetermined excess bandwidth:

$$\text{MFS} = \text{MEBW} \quad \text{(EQ 10)}$$

The processing to determine the Fair_Share value is performed as follows:

1) Determine the parameter $E_{NABR}$, using Scheduler 280, where $2^{(ENABR)}$ is $N_{ABR}$ (the number of active ABR VCs) raised to the next higher power of two. In a preferred embodiment, the relationship between $N_{ABR}$ and $E_{NABR}$ is given in the following table:

| $N_{ABR}$ in the interval | $E_{NABR}$ |
|---|---|
| 0, 1 | 1 |
| 2, 3 | 2 |
| 4, 5, 6, 7 | 3 |
| . . . | . . . |
| 1024, . . . , 2047 | 11 |

2) Calculate the Fair_Share, which is defined as: Fair_Share=Excess_BW/$2^{(ENABR)}$ where Excess_BW is a relatively static binary value programmed (and periodically updated) by the host microprocessor 150 and $E_{NABR}$ is as specified above. The Excess_BW, Fair_Share value, and the ER field value are stored in the binary floating point format shown in FIG. 3.

3) Compare the Fair_Share value calculated above with the ER field in the RM cell. If the Fair_Share value is less than the ER field in the cell, then the ER field value is replaced by the computed Fair_Share value.

Turning now to FIG. 8, a schematic view of forward ATM cell processing under the control of a Scheduler 280 is shown for effecting the transfer of the ATM cells through the Switch Fabric 154 in the forward direction. As shown, FIG. 8 depicts functional blocks of the Ingress Processor and the Egress Processor of ATM Switch 120 in greater detail. Whenever an ATM cell arrives at an Ingress Processor, it is routed to the appropriate virtual connection queue, or per-VC queue $290_1$–$290_n$, in buffers of Ingress Cell Memory 206. The specific per-VC queue is determined from reading and processing the cell header VCI and VPI fields by a Header Compression stage 201 followed by an Ingress Context Look Up stage 202 in the Ingress Cell Processor. The Header Compression stage 201 uses a predetermined scheme to convert the 28 bit VCI and VPI field in the ATM cell header to a "small integer" (11 bits), which is used as an index (address) into a per-VC context table contained in Ingress context memory 292, as shown. The Ingress Context Look Up stage 202 uses the index to look up per-VC context information, such as pointers into the Ingress Cell Memory 206, which specifies the beginning and end of per-VC queues $290_1$–$290_n$ constructed via a linked list in cell buffers in the Ingress Cell Memory 206. In a preferred embodiment, the cell buffers of Ingress Cell Memory 206, which have a predetermined cell capacity, are allocated between per-VC queues of each ATM traffic category and VCs of each category.

If a per-VC queue in Cell Memory 206 was empty immediately before storing an ATM cell in the per-VC queue, then the Ingress Processor 140 broadcasts "arrival information" 220 identifying a so-called "first cell" in the per-VC data queue. The arrival information 220, which includes a small integer representing the destination Egress Switch Port, is transmitted to all Egress Switch Ports and is picked up and stored in the particular Egress Switch Port serving the addressed egress transmission link.

When the addressed Egress Switch Port receives the arrival tag, the arrival tag is sent to a Scheduler 280. In a preferred embodiment, the Scheduler 280 stores the arrival tag, and uses a predetermined scheduling algorithm to schedule the transmission of the ATM cell over the Switch Fabric 154 at some future time. In general, the scheduling algorithm ensures that the QoS guarantees are met for all VCs of the many diverse service categories. Each cell cycle, the Scheduler 280 selects one of the active VCs, and generates a cell request 222 to the Ingress Cell Memory 206 of the appropriate Ingress Switch Port. The request is usually accepted, causing the Ingress Switch Port to read the requested ATM cell from the cell buffer of the addressed per-VC queue in Cell Memory 206 and send it to the Egress Switch Port, via the Switch Fabric 154. If the request is not accepted due to Switch Fabric 154 congestion (this can be designed to occur with very low probability, or with zero probability), then the Scheduler 280 will re-schedule the event and request the same cell again in the next cell cycle. Along with the transmitted ATM cell 224, the Ingress Switch Port supplies information about whether there are additional cells waiting in this VC queue. If there are more ATM cells in the ingress VC queue, then the Scheduler 280 will schedule the next request at a desired future time instant. If there are no more ATM cells in the VC queue, then the VC is no longer "active" and is deemed "idle" after a predetermined time delay on the order of 10–100 ms. The VC is deemed idle until another so called "first cell" arrives and starts the whole process over again (i.e., generates another first request for the VC). To complete the transfer, the Egress Processor dispatches the ATM cell on the proper Egress physical port $162_{[i]}$ for that VC. As described below, the active VC count in a per-physical port active VC counter $296_{[i]}$ is adjusted accordingly by the Scheduler 280.

As described above, the Cell Memory 206 per-VC queues $290_1$–$290_n$ can become locally or globally congested. The Cell Memory Controller 294 keeps track of the total number of ATM user cells in all of the per-VC queues $290_1$–$290_n$. The Global Congestion Threshold, GCth, is supplied by the microprocessor 150 to the Cell Memory Controller 294 which makes a comparison and sets a Global Congestion Flag in the Ingress context memory 292 if global congestion is determined as described below. The Cell Memory Controller 294 also determines if a Local Congestion Flag for a particular per-VC queue is to be set in Ingress context memory 292, which depends on the number of ATM cells in each per-VC queue and whether or not the Global Congestion Flag is set as also described above. As described above, an ER-Decrease bit is set in a cell header of ATM user cells transmitted through the Switch Fabric 154 in response to the Local Congestion Flag. The ER-Decrease bit in the cell header is detected in the Egress Processor of the Egress Switch Port and directed to Ingress context memory of the Ingress Processor of the Egress Switch Port as described above to provide an indication of congestion.

Furthermore, as illustrated in FIG. 8, the preferred embodiment contains the per VC data queues 290n in the ingress cell processor stage 140 (e.g., the preferred embodiment is of the "input queued" class of ATM switch architectures). However, it should be noted that other ATM switch architectures exist. In particular, centrally queued ATM switch architectures contain the per VC queues in the switch fabric 154 and output queued ATM switch architectures contain the per VC queues in the egress cell processor 142. While the best mode of practicing the present invention described above refers to "ingress cell memory congestion" in step S600, it will be understood that these operations could also be performed in centrally queued, or output queued ATM switches.

FIG. 8 also shows that the Scheduler 280 increments and decrements a count Nabr of user cells destined to be routed to the corresponding Egress physical port $162_{[i]}$ in a per-physical port active VC counter $296_{[i]}$. A physical port excess cell transmission rate (Excess_BW) is maintained in the Egress context memory 282. The Excess_BW stored in Egress context memory 282 for each Egress physical port $162_{[i]}$ is determined by an algorithm in the microprocessor 150 as described above. From the physical port excess cell transmission rate (Excess_BW) and the number $N_{ABR}$, a Fair Share cell transmission rate is determined in the Ingress Processor of the Egress Switch Port (not shown in FIG. 8) and written into the backward RM cells of the affected ABR VCs through the ATM Switch 120 as described above.

Figure 9:
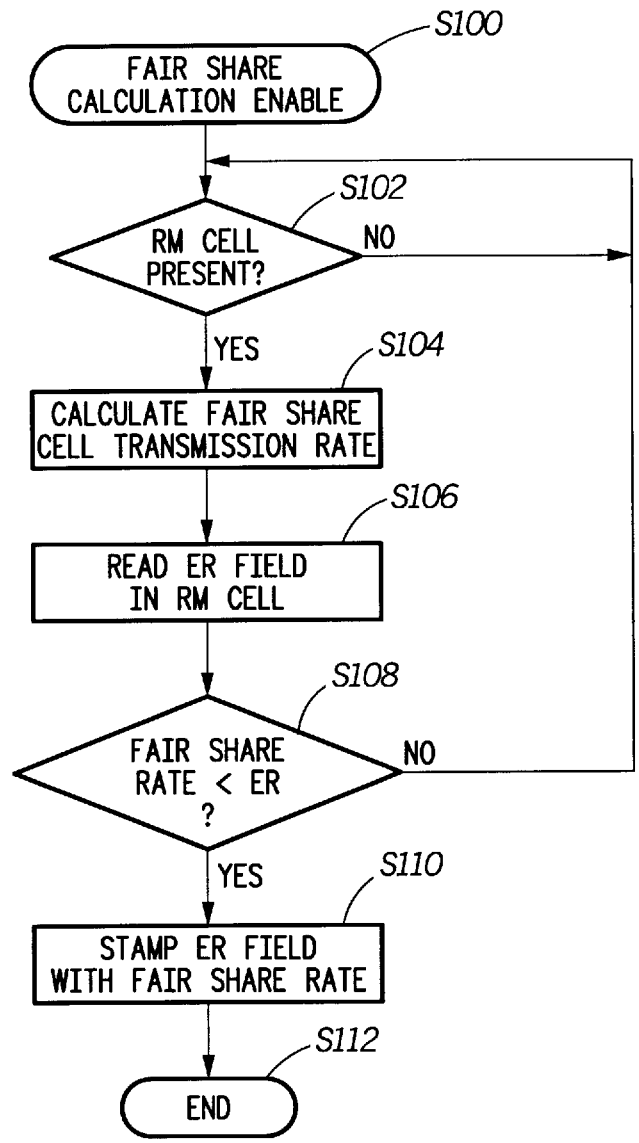
FIG. 9 shows a flow diagram depicting the general steps of calculating a Fair Share cell transmission rate and stamping it into the ER field of the control or RM cells.
Figure 10:
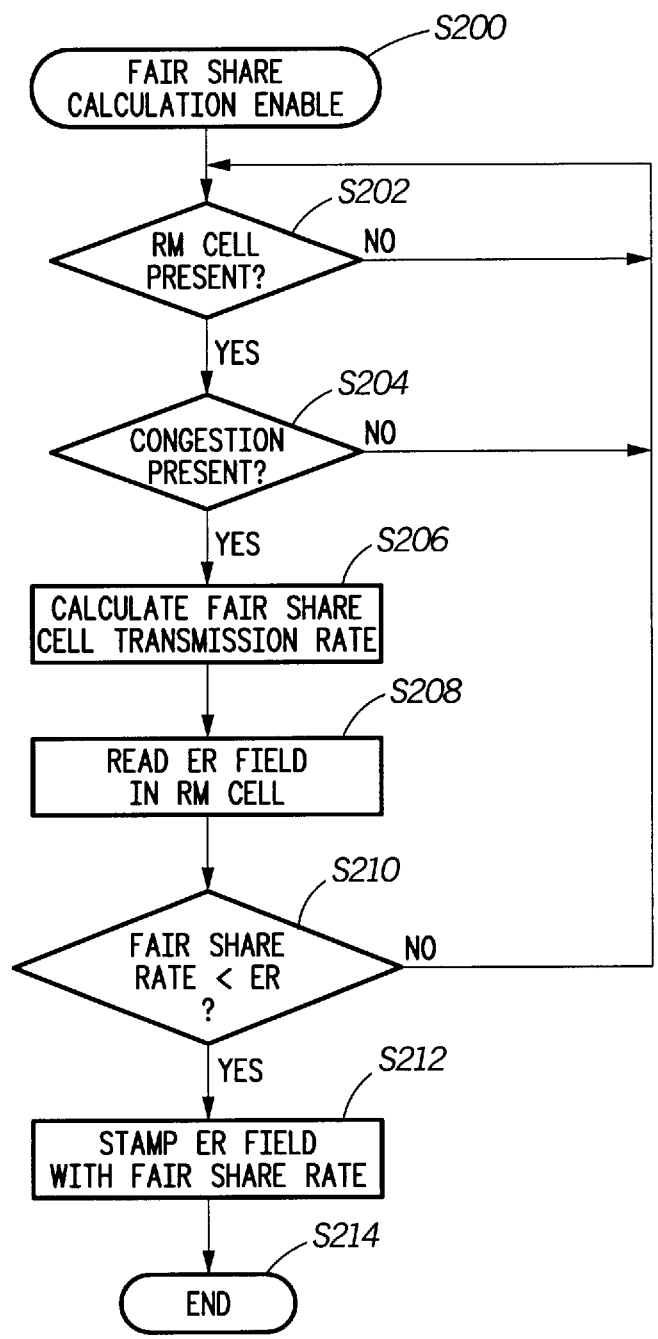
FIG. 10 shows a flow diagram depicting the additional step of determining the presence of congestion and calculating a Fair Share cell transmission rate and stamping it into the ER field of the control or RM cells only in the presence of congestion.
Figure 11:
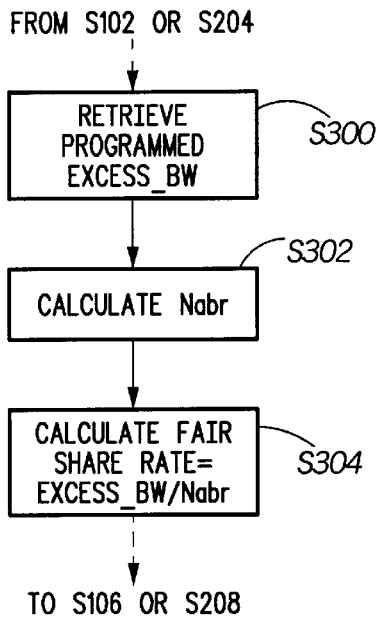
FIGS. 11–13 show flow diagrams depicting particular alternative steps of calculating the Fair Share cell transmission rate, in accordance with the invention.
Figure 12:
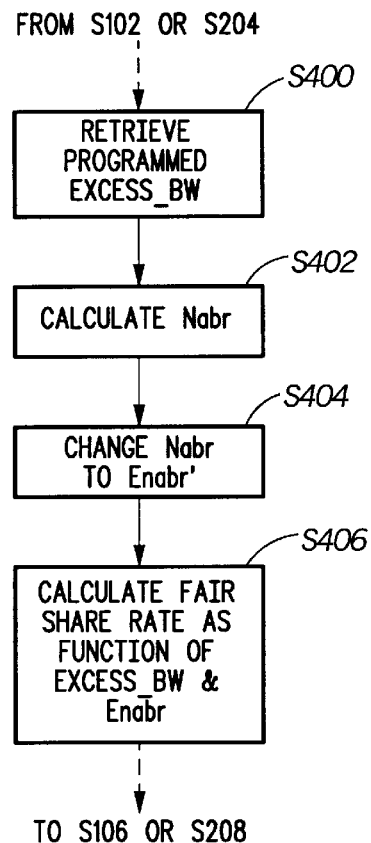
Figure 13:
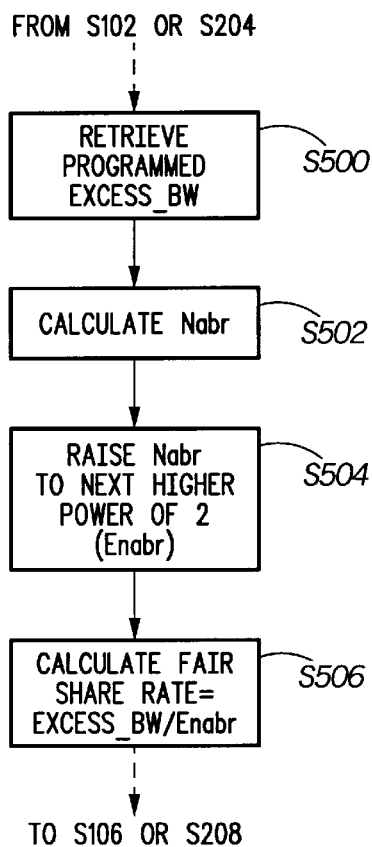
Figure 14:
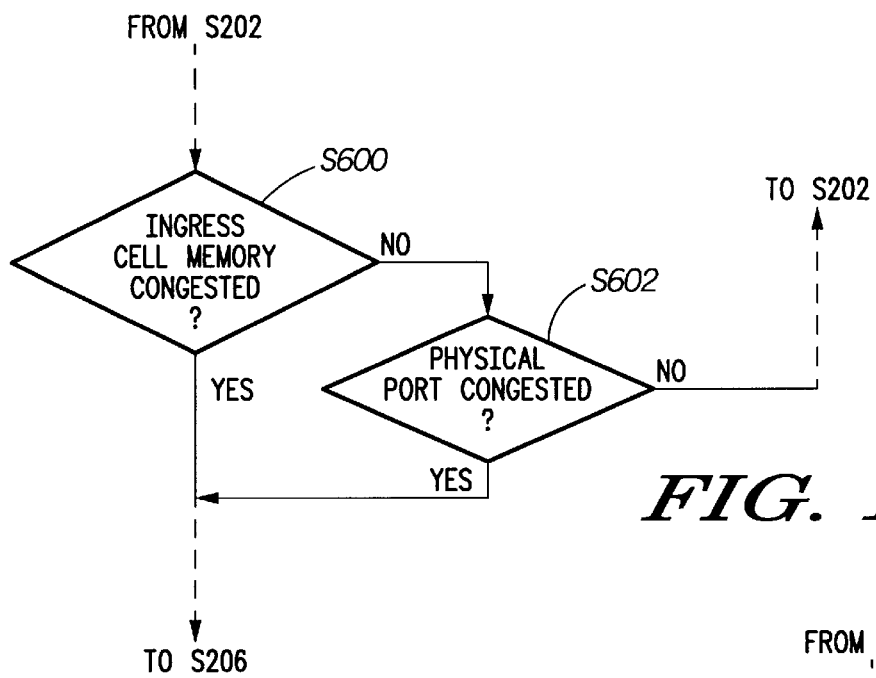
FIG. 14 shows a flow diagram depicting steps of determining different types of congestion shown in FIG. 10 in either forward or backward processing of control or RM cells.
Figure 15:
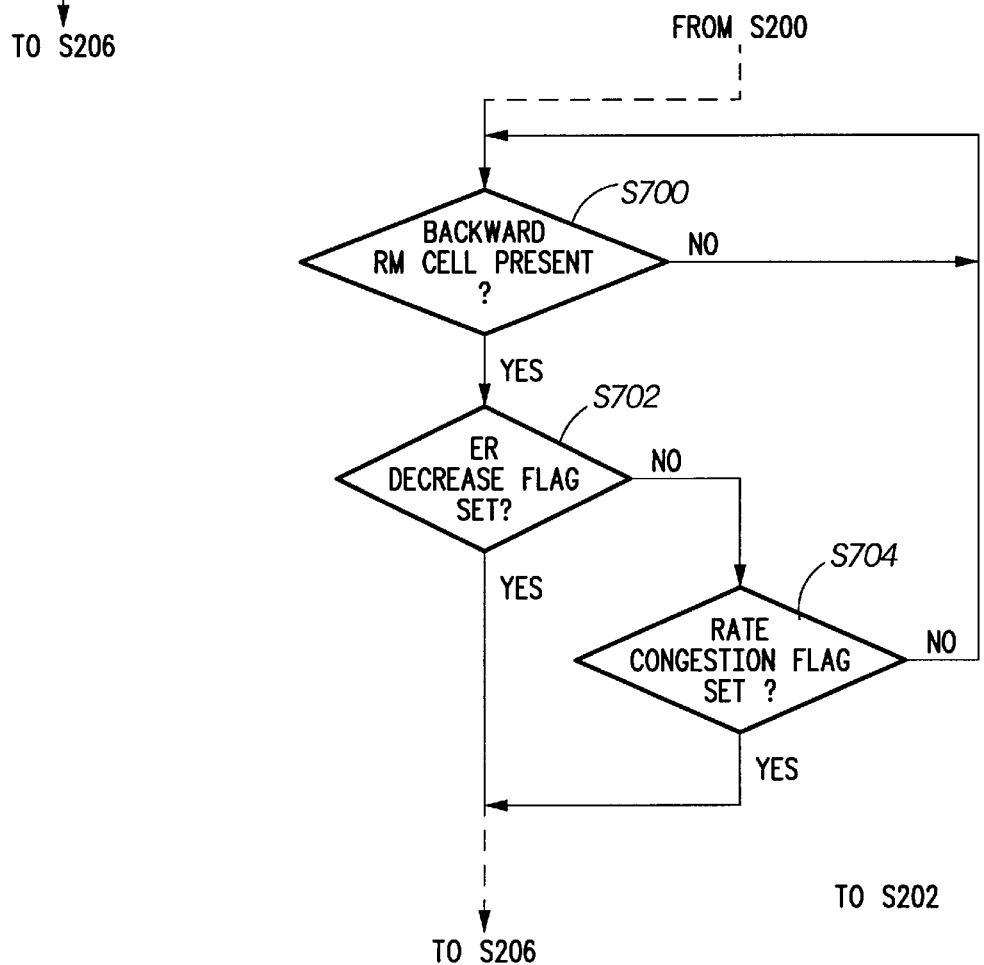
FIG. 15 shows a flow chart illustrating particular steps of initiating the calculation of the Fair Share cell transmission rate in FIG. 10 when a backward control or RM cell is present and in response to different set indications of congestion.

FIGS. 9–15 describe the preferred embodiments of practicing the invention in several levels of detail. FIG. 9 illustrates the general steps of calculating a Fair Share cell transmission rate and stamping it into the ER field of the control or RM cells. FIG. 10 illustrates the embodiment of doing so only in the presence of congestion. FIGS. 11–13 illustrate particular alternative steps of calculating the Fair Share cell transmission rate described above in either method of FIGS. 9 and 10. FIG. 14 illustrates steps of determining different types of congestion that can be performed at step S204 of FIG. 10 in either forward or backward processing of control or RM cells. FIG. 15 illustrates particular steps of responding in the backward path of backward RM cells to the different set indications of congestion, i.e., the ER Decrease flag and/or the rate congestion flag, described in detail above, that can be performed in steps S202 and S204 of FIG. 10. The alternative steps illustrated in FIGS. 11–15 can be performed in any combination in the steps of FIGS. 9 and 10.

Turning to FIG. 9, it illustrates the steps of the invention in its broad application to the calculation of a Fair_Share value in relation to the processing of control, or RM cells, without regard to where the processing takes place in the ATM switch. At step S100, the Fair Share cell transmission rate calculation is enabled. At step S102, the RM cell presence is noted, and in step S104, the calculation is completed. At steps S106 and S108, the ER field value is read and compared to the Fair Share rate. If the Fair Share cell transmission rate is lower than the ER field value, it is written into the ER field in step S110. The process then ends and is restarted when another control or RM cell arrives. It is preferred that this processing take place with respect to the backward RM cells, as described above, because doing so results in a more timely reduction of the source transmission rate.

The flow chart steps of FIG. 10 differ from those of FIG. 9 in the determination of congestion at additional step S204. If congestion is not present when a control or RM cell arrives at step S202, then the algorithm loops back to await a further RM cell. The operations of steps S206–S214 are completed in the same manner as those of steps S104–S112 of FIG. 9 only if congestion is found to be present at step S204.

At the conclusion of these process steps illustrated in FIGS. 9 and 10, the RM cell is returned to the SES (FIG. 4), and the Fair_Share value in the ER field is used to change the cell transmission rate of the SES to the Fair Share transmission rate written into the returned RM cell.

FIGS. 11–13 depict first, second and third sets of alternative steps of calculating the Fair Share cell transmission rate in steps S104 and S206 of FIGS. 9 and 10, respectively. In each case of FIGS. 11–13, the programmed Excess_BW or maximum cell transmission rate of the physical port (as described above) is retrieved for use in the calculation in steps S300, S400 and S500. The "retrieval" of the programmed Excess_BW value may not necessarily be done every time an RM cell arrives at step S102 or S202. The Excess_BW value need only be available in some fashion for use in the subsequent steps. In the next steps S302, S402 and S502, the $N_{ABR}$ value is calculated as described above.

In FIG. 11, the Fair Share cell transmission rate is calculated by simply dividing the maximum cell transmission rate, or Excess_BW, by the number $N_{ABR}$ in step S304. In FIG. 12, after it is calculated in step S402, the number $N_{ABR}$ is changed to $E_{NABR}$ at step S404, which can be a mathematical simplification or approximation of the actual number $N_{ABR}$, e.g., a quantized version of Nabr other than the next higher power of two (which offers approximately the same benefits of raising $N_{ABR}$ to the next higher power of 2, as described above). Then, the Fair Share rate is calculated as a function of the Excess_BW and $E_{NABR}$ in step S406. In FIG. 13, after it is calculated in step S502, the number $N_{ABR}$ is raised or incremented to the next higher power of 2, or $E_{NABR}$, (as described above) in step S504. The Fair Share cell transmission rate is then calculated in step S506 by dividing the Excess_BW value by $E_{NABR}$. It will be understood that the step S404 may be substituted for step S504, and that other substitutions of steps of FIGS. 11–13 may be made in the practice of the invention.

Turning to FIG. 14, step S204 of determining the presence of congestion is expanded to specifically determine the presence of either or both of Ingress Cell Memory congestion in step S600 or physical port rate congestion in step S602. Both steps are shown in FIG. 14, but it will be understood that one or the other and equivalent steps thereto could be employed in step S204 of FIG. 10. Steps S206–S214 of FIG. 10 are initiated only if one or the other form of congestion is found to be present in steps S600 and/or S602.

In FIG. 15, the particular set indications of congestion established in the forward path of ATM cells as described above are checked in steps S702 and/or S704 when a backward control or RM cell is found to be present in step S700. Step S700, directed particularly to responding to backward control or RM cells is therefore substituted for step S202, of FIG. 10. The ER Decrease flag checked in step S700 and the rate congestion flag is checked in step S702 when a backward control or RM cell is present in step S700. Again, steps S206–S214 of FIG. 10 are initiated only if one or the It should also be noted that the specific order of steps S600–S602 and S704–S706 in determining the presence of rate congestion or local or global ingress Cell Memory congestion may be reversed or completed in parallel.

Returning to FIG. 13, by incorporating the above described mathematical simplification, the calculation of the Fair_Share value used as the Fair Share cell transmission rate in step S506 has been reduced to a simple 5 bit subtract operation (i.e., a single 5 bit ALU) as embodied by EQ 9. In order to calculate EQ 9, one needs to determine the quantized version of $N_{ABR}$ (e.g., $E_{NABR}=2^{EN}$), where $E_{NABR}$ is $N_{ABR}$ raised to the next higher power of 2. The preferred embodiment performs the quantization of NABR and the calculation of the exponent of the Fair_Share value (EQ 10) in a single iterative loop as described in the following. These two steps can be accomplished simultaneously inside a processor (or dedicated logic) that implements an iterative loop which: 1) decrements the exponent by one each time through the loop; and 2) right shifts a binary representation of $N_{ABR}$ (i.e., divides by 2, with truncation) each time through the loop. The iteration proceeds until either the shifted value of $N_{ABR}$ reaches zero (the normal end of the loop), or until the exponent reaches zero.

The preferred embodiment of the present invention therefore provides a method and apparatus for simplifying the calculation of the Fair_Share value achieved by rounding up $N_{ABR}$ to $E_{NABR}$. The inventive method is preferably implemented only in the presence of congestion in the cell based network switch or a physical port attached to the switch. The form of congestion is preferably one or all of local congestion in a per-VC queue in an ATM switch Cell Memory, global congestion of the Cell Memory buffers or rate congestion on the egress physical port. The simplification speeds the calculation process allowing it to be conducted at high transmission rates without unduly increasing the complexity of the ATM Switch.

The best mode of practicing the invention is 10 described in the context of a single, point-to-point, control loop VC 110 depicted in FIG. 4. It will be understood that the present invention may be implemented in a segmented network of the type described in the above-referenced Bonomi article having rate-based segmented control loops formed by designating certain ATM Switches as Virtual Sources (i.e., user sources or SESs) and Virtual Destinations (i.e., user destinations or DESs) as described therein and alternatives thereto. In addition, the present invention may have application in point-to-multipoint VCs.

While the best mode of practicing the invention described above contemplates calculating and stamping the Fair_Share value in the backward RM cells, it will be understood that these operations could also be performed in respect to the forward RM cells in the Egress Cell Processor buffer prior to routing the forward RM cells to the physical port by changing the order of the method steps described above. Moreover, these operations have application to other forms of cell based or packet based networks for transmitting information, where control of a user source is desirable in order to control congestion within the network.

What is claimed is:

1. In a cell based network for transmitting user cells, including data cells and control cells defining an explicit rate, at predetermined cell rates in a forward direction from at least one user source to at least one user destination in a virtual connection through a transmission path including at least one switch and at least one egress transmission link coupled to the switch by an egress physical port, each switch and physical port of each transmission link having limited cell transmission resources and being susceptible to congestion of multiple virtual connections made therethrough, a method of reducing such congestion comprising the steps of:

establishing a programmed cell rate for each egress physical port coupled to the switch;

upon the arrival of a control cell at the switch, calculating a user source fair share cell transmission rate by:

determining a count of a number of virtual connections through the egress physical port coupled to the switch;

quantizing the count of the number of virtual connections by incrementing the count of the number of virtual connections to a next higher power of two, thereby producing a quantized count; and determining a fair share cell transmission rate as a function of the programmed cell rate and the quantized count; and changing the explicit rate in the control cell arriving at the switch to the fair share cell transmission rate.

2. The method of claim 1 further comprising the steps of:

determining, at the switch, the presence of congestion of the limited resources of any one of the switch and the at least one transmission link coupled thereto; and selectively initiating, in response to the step of determining, the step of calculating the user source fair share cell transmission rate when congestion is present.

3. The method of claim 1 wherein said cell based network operates to transmit said user cells in a bi-directional manner in forward and backward directions according to the steps of:

at each user source, periodically transmitting the user cells including control cells and data cells to each transmission link and switch in the virtual connection in the forward direction to the user destination, the control cells having an explicit rate field;

at each switch, and during the transmission of user cells in the forward direction, determining whether congestion is present in virtual connections in the switch and in physical ports coupled thereto;

at each destination, sending control cells as backward control cells in a backward direction of the virtual connection through said switch and physical ports to said user source;

at each switch, and only in the presence of congestion, changing an explicit rate field value for those backward control cells related to congested virtual connections; and at the user sources, and upon return of the backward control cells, changing a present cell transmission rate to the explicit rate field value.

4. The method of claim 1 wherein the step of determining a count comprises the step of dynamically measuring active virtual connections (VCs), and wherein the step of determining the fair share cell transmission rate further comprises the step of dividing the maximum cell transmission rate by the number of active VCs.

5. The method of claim 1 wherein the step of determining the fair share cell transmission rate further comprises the step of dividing the programmed cell rate by the quantized count in a manner that does not require a floating point calculation.

6. In a cell based network for transmitting user cells, including data cells and control cells defining an explicit rate, at predetermined cell rates in a forward direction from at least one user source to at least one user destination in a virtual connection through a transmission path including at least one switch and at least one egress transmission link coupled to the switch by an egress physical port, each switch and physical port of each transmission link having limited cell transmission resources and being susceptible to congestion of multiple virtual connections made therethrough, a method of reducing such congestion comprising the steps of:
   establishing a programmed cell rate for each egress physical port coupled to the switch;
   determining a count of a number of virtual connections through the egress physical port coupled to the switch, the step of determining comprising:
      providing an indicia of VC activity in the egress physical port; and
      altering the indicia of VC activity based on whether a first VC is active; and
   upon the arrival of a control cell at the switch, calculating a user source fair share cell transmission rate, the step of calculating comprising:
      quantizing the count of the number of virtual connections by incrementing the count of the number of virtual connections to a next higher power of two thereby producing a quantized count; and
      determining the fair share cell transmission rate as a function of the programmed cell rate and the quantized count.

7. The method of claim 6 wherein the indicia comprises a counter, and wherein said step of altering the indicia comprises the step of incrementing the counter when the first VC is found to be active.

8. The method of claim 7, wherein the indicia comprises a counter, and wherein said step of altering the indicia comprises the step of decrementing the counter when the first VC is found to be idle.

9. The method of claim 6 wherein the indicia comprises a flag, and wherein said step of altering the indicia comprises the step of setting the flag when the first VC is found to be active.

10. The method of claim 7, wherein the indicia comprises a flag, and wherein said step of altering the indicia comprises the step of clearing the flag when the first VC is found to be idle.

11. In an Asynchronous Transfer Mode (ATM) information network for serially transmitting ATM user cells of ATM traffic categories, including Available Bit Rate (ABR) traffic comprising ABR user data cells and Resource Management (RM) cells having Explicit Rate (ER) fields, each ATM user cell having a defined header with identification data defining a Virtual Connection (VC) from an ATM traffic user source (SES) in a transmission path including one or more ATM switches and interconnecting transmission links having physical ports coupled with the ATM Switches, to an ATM user destination (DES) at an actual cell transmission rate established at the SES, wherein congestion of VCs in a transmission path may occur, a method of controlling such congestion by reducing the actual cell transmission rate of ABR traffic to a Fair Share cell transmission rate comprising the steps of:
   transmitting data and RM cells of ABR traffic from the SES in a forward direction in a VC through the transmission path at the cell transmission rate;
   at each ATM switch in the transmission path of the VCs in the forward direction,
      determining whether egress or ingress congestion exists in the ATM switch, and providing an indication of congestion in response thereto; and
      determining a programmed cell rate of the physical port of the VC having the indication of congestion;
   sending backward RM cells of ABR traffic in a backward direction from the DES to each ATM switch in the transmission path of each VC;
   on receipt of a backward RM cell at each ATM switch in the transmission path of the VC, responding to the indication of congestion by:
      determining a count of the number of VCs through the egress physical port coupled to the ATM Switch; and
      quantizing the count of the number of VCs to an incremented count of a power of two;
      determining a Fair Share cell transmission rate as a function of the programmed cell rate of the egress physical port used in the VC and the incremented count;
      writing the Fair Share cell transmission rate in the ER fields of the backward RM cells; and
      sending the backward RM cells of the ABR traffic in the backward direction from each such ATM switch in the transmission path of each VC toward the SES; and
   at the SES, changing the actual cell transmission rate of ABR traffic generated by the SES to the Fair Share cell transmission rate.

12. The method of claim 11 further comprising the step of:
   comparing the explicit rate in the backward RM cells received at the switch to the Fair Share cell transmission rate prior to changing the explicit rate; and
   selectively changing the explicit rate, responsive to the step of comparing, when the Fair Share transmission rate is found to be less than the explicit rate.

13. The method of claim 11 wherein the step of determining the Fair Share cell transmission rate further comprises the step of dividing the maximum cell transmission rate by the incremented count.

14. The method of claim 11 wherein said step of quantizing the count of the number of VCs and the step of determining the Fair Share cell transmission rate are performed substantially simultaneously using a single iterative loop.

15. The method of claim 14, wherein an exponent of the actual cell transmission rate is stored in a first memory location and the count of the number of VC's is stored in a second memory location, and wherein the step of using a single iterative loop comprises the step of;
   decrementing the exponent stored in the first memory location by one; and
   right-shifting the number of VC's stored in the second memory location.

16. In an Asynchronous Transfer Mode (ATM) information network for serially transmitting ATM user cells of ATM traffic categories, including Available Bit Rate (ABR) traffic comprising ABR user data cells and Resource Management (RM) cells having Explicit Rate (ER) fields, each ATM user cell having a defined header with identification data defining a Virtual Connection (VC) from an ATM traffic user source (SES) in a transmission path including one or more ATM switches and interconnecting transmission links having maximum cell transmission rates, to an ATM user destination (DES) at a cell transmission rate established at the SES, wherein congestion of VCs in a transmission path may occur, apparatus for controlling such congestion through controlling the cell transmission rate of ABR traffic to a Fair Share cell transmission rate comprising:

means for transmitting data and RM cells of ABR traffic from the SES in a forward direction in a VC through the transmission path at the cell transmission rate;

at the ATM switch in the transmission path of the VCs in the forward direction, means for determining the presence of congestion of the ATM switch ingress cell memory or of an egress physical port coupled thereto and providing a set indication of congestion in response thereto;

means for determining a maximal cell transmission rate of the physical port of the VC having the set indication of congestion;

means for sending backward RM cells of ABR traffic in a backward direction from the DES to each ATM switch in the transmission path of each VC;

at the ATM switch in the transmission path of the VCs in the backward direction, means operable on receipt of a backward RM cell at each ATM switch in the transmission path of the VC including:

means for determining a count of the number of VCs through the egress physical port coupled to the ATM Switch; and means for changing the count of the actual number of VCs to a changed count of a power of two;

means for determining a Fair share cell transmission rate as a function of the maximum cell transmission rate of the egress physical port used in the VC and the changed count;

means for writing the Fair Share cell transmission rate in the ER fields of the backward RM cells; and means for sending the backward RM cells of the ABR traffic in the backward direction from each such ATM switch in the transmission path of each VC toward the SES; and at the SES, means for changing the actual cell transmission rate of ABR traffic generated by the SES to the Fair Share cell transmission rate in the ER field of the backward RM cells.

17. The apparatus of claim 16 further comprising:

means for comparing the cell transmission rate in the ER field in the backward RM cells received at the ATM switch to the Fair Share cell transmission rate prior to changing the ER; and means for selectively writing the ER field, in response to the means for comparing, when the Fair Share cell transmission rate is less than the cell transmission rate in the ER field.

18. The apparatus of claim 16 wherein the means for determining the Fair Share cell transmission rate further comprises means for dividing the maximum cell transmission rate by the changed count.

19. The apparatus of claim 18 wherein said means for changing the count further comprises means for incrementing the count to the next higher power of two.

20. The apparatus of claim 16 wherein said means for changing the count further comprises means for incrementing the count to the next higher power of two.

* * * * *